(12) United States Patent
Kaneko et al.

(10) Patent No.: US 6,433,842 B1
(45) Date of Patent: Aug. 13, 2002

(54) LIQUID CRYSTAL DISPLAY DEVICE AND METHOD OF MANUFACTURING THE SAME

(75) Inventors: Toshiki Kaneko, Chiba; Masaru Takabatake; Takahiro Ochiai, both of Mobara; Takuya Takahashi; Katsumi Tamura, both of Hitachi; Kenichi Onisawa, Hitachinaka; Kenichi Cyahara, Hitachi; Masatomo Terakado, Chiba; Yuichi Harano, Hitachi; Hideaki Yamamoto, Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/537,395

(22) Filed: Mar. 29, 2000

(30) Foreign Application Priority Data

Mar. 26, 1999 (JP) ............................. 11-083686
Mar. 30, 1999 (JP) ............................. 11-089437
Dec. 9, 1999 (JP) ............................. 11-349787

(51) Int. Cl.$^7$ ............................................. G02F 1/136
(52) U.S. Cl. .......................... 349/43; 349/44; 349/46; 349/47
(58) Field of Search ......................... 349/139, 43, 44, 349/46

(56) References Cited

U.S. PATENT DOCUMENTS

| | | | | | |
|---|---|---|---|---|---|
| 4,302,321 A | * | 11/1981 | Denora et al. | ............... | 204/291 |
| 4,715,893 A | * | 12/1987 | Shinner et al. | ............... | 75/249 |
| 4,846,885 A | * | 7/1989 | Asphahani et al. | ........... | 75/246 |
| 5,059,267 A | * | 10/1991 | Nishio | .................. | 156/89 |
| 5,087,553 A | * | 2/1992 | Adachi et al. | .............. | 430/323 |
| 5,162,933 A | * | 11/1992 | Kakuda et al. | .............. | 359/59 |
| 5,736,751 A | * | 4/1998 | Mano et al. | ................. | 257/66 |
| 5,811,058 A | * | 9/1998 | Baba et al. | ................. | 420/410 |
| 5,926,235 A | * | 7/1999 | Han et al. | .................... | 349/43 |
| 5,976,988 A | * | 11/1999 | Kunuma et al. | ........... | 438/745 |
| 5,995,188 A | * | 11/1999 | Shimizu et al. | ............ | 349/147 |
| 6,001,539 A | * | 12/1999 | Lyu et al. | .................. | 430/317 |
| 6,008,869 A | * | 12/1999 | Oana et al. | .................... | 349/43 |
| 6,040,206 A | * | 3/2000 | Kurogane et al. | .......... | 438/149 |
| 6,081,308 A | * | 7/2000 | Jeong et al. | ................... | 349/42 |
| 6,106,907 A | * | 8/2000 | Yoshikawa et al. | ......... | 428/1.1 |
| 6,130,443 A | * | 10/2000 | Hong et al. | ................... | 257/59 |
| 6,226,060 B1 | * | 5/2001 | Onisawa et al. | ............. | 349/43 |

* cited by examiner

Primary Examiner—Toan Ton
Assistant Examiner—Hoan Nguyen
(74) Attorney, Agent, or Firm—Antonelli, Terry, Stout & Kraus, LLP

(57) ABSTRACT

The method of fabrication of a liquid crystal display device includes the steps of: forming a metal thin film on a glass substrate; forming a resist pattern on the metal thin film by photolithography; and wet-etching the metal thin film with an etchant formed of a mixture including phosphoric acid, nitric acid in a range between 7 mol % and 12 mol % inclusive, and at least one of ammonium fluoride and hydrogen fluoride in a trace amount of about 0.01 to 0.1 mol %.

33 Claims, 15 Drawing Sheets

LIQUID CRYSTAL DISPLAY DEVICE AND METHOD OF MANUFACTURING THE SAME

BACKGROUND OF THE INVENTION

The present invention relates to an active matrix liquid crystal display device driven by thin film transistors (TFTs), and an interconnection formation method for such a liquid crystal display device.

In recent years, the market for TFT-driven liquid crystal display devices (TFT-LCDs) has expanded, compared with conventional CRTs, as they have recognized as image display devices capable of realizing further reduction in size and weight and improvement in definition. Such a TFT-LCD mainly includes: a glass substrate on which gate lines, data lines, TFTs formed at the respective intersections between the gate lines and the data lines, pixel electrodes connected to the TFTs, a gate insulating film, and a protection film are formed; a counter substrate; and a liquid crystal layer sandwiched by the glass substrate and the counter substrate.

With the recent progress in the achievement of a larger screen size and higher definition of TFT-LCDs, the requirements for lower resistance of interconnections and lower production yield have become stricter. For lowering the resistance of interconnections, aluminum or an aluminum alloy has been conventionally used. However, when a single layer of aluminum or an aluminum alloy is used for interconnections, hillocks tend to be generated on the surface of the interconnections, resulting in that an insulating film formed over the interconnections fails to cover them sufficiently (coverage failure). Moreover, aluminum or an aluminum alloy exhibits high contact resistance against an indium-containing oxide used as the material of pixel electrodes, such as indium tin oxide (ITO) and indium zinc oxide (IZO). It is therefore impractical to attempt direct electrical connection therebetween. In order to overcome these problems, in an inverted-stagger type TFT-LCD, gate lines are formed of a cladding structure in which a metal having a high melting point covers a wiring pattern of aluminum or an aluminum alloy. In this cladding structure, the second conductive layer (metal) covering the wiring pattern of aluminum or an aluminum alloy provides the contact characteristics with the pixel electrode material, while the aluminum or an aluminum alloy provides the conductivity as the interconnections. Such a structure is disclosed in, for example, Japanese Patent Laid-Open Nos. 341299/1993, 64109/1995, 26602/1997, 127555/1997, and 213809/1998.

The formation of the above cladding structure requires a complicate process including two photolithographic steps, one for the aluminum or aluminum alloy and the other for the second conductive layer. In order to make the process simpler, the layer of aluminum or an aluminum alloy and the second conductive layer are sequentially formed and etched at one time in one photolithographic step to form a wiring pattern. For this procedure, molybdenum or a molybdenum alloy is used for the second conductive layer since molybdenum is a metal having a high melting point allowing for one-time etching with aluminum or an aluminum alloy. Japanese Patent Laid-Open No. 20930/1992, particular, discloses an interconnection structure using a molybdenum alloy containing 0.5 to 10 wt % of chromium as the second conductive layer. In this disclosure, the layered structure is wet-etched at one time with a mixed solution of phosphoric acid, nitric acid, and acetic acid. The section of the resultant interconnection has a taper angle of 50°. Such a molybdenum-chromium alloy has a resistance against dry etching with a fluoric gas such as SF6. This provides an advantage as follows. When a contact hole or the like is formed through an overlying SiN insulating film by dry etching with SF6 gas, the second conductive layer made of the molybdenum-chromium alloy will not be etched away at the bottom inside the contact hole, ensuring connection with the pixel electrode and thus providing good contact characteristics with the pixel electrode.

There is a report on examinations on the sectional shapes of an interconnection of a molybdenum/aluminum layered structure when etched by a dip method and a shower method (Digest of Technical Papers of 1994 International Workshop on Active-Matrix Liquid-Crystal Displays, Nov. 30–Dec. 1, 1994, Kogakuin University, Shinjuku, Tokyo, Japan, p.188). More specifically, the molybdenum/aluminum layered structure was subjected to one-time etching with a mixed solution of phosphoric acid and nitric acid by the dip method and the shower method, and the sectional shapes of the resultant interconnection obtained by the two etching methods were examined. According to this report, in the dip method, the section of the interconnection was tapered, while in the shower method, the molybdenum layer protrudes like a brim relative to the aluminum layer.

Japanese Laid-Open Patent Publication No. 331066 of 1997 discloses the use of titanium, molybdenum, tantalum, tungsten, zirconium, or a composite material thereof as the second conductive layer. According to this disclosure, a light-shading film and interconnections are simultaneously formed in the same process, with the second conductive layer playing a role of minimizing the reflectance of the light-shading film. No specific combination of elements for the composite material when selected as the second conductive material is mentioned in this disclosure.

Japanese Patent Laid-Open No. 258633/1999 discloses a fabrication method of an array substrate of a display device in which the second conductive layer is formed of a metal selected from chromium, molybdenum, tungsten, titanium, zirconium, hafnium, vanadium, niobium, and tantalum or an alloy thereof. According to this disclosure, the formation of such a second conductive layer prevents generation of a hillock on an aluminum alloy film and also prevents corrosion of the aluminum alloy during dry etching of pixel electrodes. No specific combination of elements for an alloy or the composition of such an alloy when selected as the second conductive layer is mentioned in this disclosure.

SUMMARY OF THE INVENTION

For enhancing the productivity of the array substrate of a liquid crystal display device, the size of the mother glass substrate has become larger. For example, according to Flat Panel Display 2000, Nikkei BP, P.56 (1999), the production lines for substrates of 590×670 $mm^2$, 600×720 $mm^2$, and 650×830 $mm^2$ were in actual operation in 1998, and in the year of 2000, production lines for 680×880 $mm^2$ and 730×920 $mm^2$ are expected to be in operation. To correspond to such size increase of the mother glass substrates, the size of the fabrication equipment has become larger. In the case of a wet etching apparatus, as the size of the apparatus increases, sufficient stirring of an etchant becomes difficult in the dip method, and thus it is almost impossible to realize uniform etching over a large-area substrate. In order to obtain highly uniform wet etching over a large-area substrate, therefore, the shower method must be employed. However, the shower method has the problem described above. That is, in the shower method, when a layered structure of a molybdenum layer and an aluminum layer is etched at one time with a mixed solution of phosphoric acid and nitric acid, the molybdenum layer protrudes like a brim relative to the aluminum layer. This sectional shape of the interconnection was also confirmed by the present inventors in an experiment where a layered structure composed of a molybdenum alloy layer and an aluminum alloy layer was etched at one time with a mixed solution of phosphoric acid, nitric acid, and acetic acid by the shower method. If an insulating film is formed over the resultant interconnection having such a sectional shape, the insulating film may generate coverage failure, resulting in lowering the production yield.

In view of the above, the first challenge of the present invention is to obtain a tapered sectional shape of the interconnection having a layered structure of a molybdenum alloy and an aluminum alloy by the shower wet etching method thereby to ensure good coverage of the overlying insulating film. The second challenge of the present invention, which should be solved together with the first challenge, is to provide the second conductive layer with a resistance against dry etching with a fluoric gas such as SF6 so that when a contact hole or the like is formed through an overlying SiN insulating film, the second conductive layer will not be etched away at the bottom inside the contact hole, securing connection with the pixel electrode. In the case of one-time etching of the layered structure of a molybdenum alloy as the upper layer and an aluminum alloy as the lower layer, the side faces of the lower aluminum alloy layer are exposed. Hillocks may be generated on such faces. The third challenge of the present invention is to minimize generation of such hillocks of the aluminum alloy. High production efficiency and securement of a process margin as large as possible are also attempted to attain in the present invention.

The first means for solving the above first and second challenges simultaneously is to use, as the second conductive layer, such a material that has a resistance against dry etching with a fluoric gas such as SF6 equal to or higher than that of the molybdenum-chromium alloy and also has a wet etching rate sufficiently higher than that of the molybdenum-chromium alloy for an etchant used in the one-time etching with the aluminum alloy.

In order to find such a material, the present inventors have prepared various molybdenum alloys containing any of chromium, titanium, tantalum, zirconium, and hafnium at a variety of concentrations, and measured the dry etching rates for SF6 gas and the wet etching rates for a mixed solution of phosphoric acid, nitric acid, and acetic acid for the various molybdenum alloys. The results are as shown in FIG. 20, in which the X-axis represents the wet etching rate and the Y-axis represents the dry etching rate.

All the molybdenum alloys exhibited curves indicating that both the wet etching rate and the dry etching rate decrease as the concentration of the added element in the alloy increases. The detected lower limit value of the dry etching rate was 0.02 nm/s. As for the molybdenum-tantalum alloy, the dry etching rate little decreases while the wet etching rate greatly decreases in comparison with the molybdenum-chromium alloy. Therefore, the molybdenum-tantalum alloy is not suitable for the purpose of the present invention. This is also applicable to a molybdenum-tungsten alloy and a molybdenum-niobium alloy. On the contrary, as for the molybdenum-zirconium alloy and the molybdenum-hafnium alloy, the dry etching rate greatly decreases while the wet etching rate does not decrease so largely in comparison with the molybdenum-chromium alloy. These alloys are therefore suitable for the purpose of the present invention. Although not shown in the figure, vanadium-added molybdenum alloy has also an effect of greatly reducing the dry etching rate.

In the case of using the second conductive layer for gate lines, the required dry etching resistance of the second conductive layer is such that the etching selectivity ratio of an overlying SiN layer to the second conductive layer is 7 or more. Since the dry etching rate of SiN for SF6 gas is 19.4 nm/s, this requirement on the dry etching resistance will be satisfied if the dry etching rate of the second conductive layer is 2.78 nm/s or less. The amount of the added element required to obtain this dry etching rate: is 2.6 wt % or more for zirconium and 4.9 wt % or more for hafnium. In the case of using the second conductive layer for drain lines, the required dry etching resistance of the second conductive layer is such that the etching selectivity ratio of the overlying SiN layer to the second conductive layer is 14 or more. Since the dry etching rate of SiN for SF6 gas is 19.4 nm/s, this requirement on the dry etching resistance will be satisfied if the dry etching rate of the second conductive layer is 1.39 nm/s or less. The amount of the added element required to obtain this dry etching rate is 4.0 wt % or more for zirconium and 7.3 wt % or more for hafnium.

In order to obtain a tapered sectional shape of the interconnection with the layered structure of the aluminum alloy layer and the second conductive layer by one-time wet etching of both layers, the second conductive layer is required to have a wet etching rate equal to or higher than that of the aluminum alloy. The amount of the added element necessary to satisfy this requirement is 23 wt % or less for zirconium and 36 wt % for hafnium. In order to secure a sufficient margin for tapering control in the shower etching method, the wet etching rate 2.4 times as high as that of the aluminum alloy is required. The amount of the added element necessary to satisfy this requirement is 14 wt % or less for zirconium and 22 wt % or less for hafnium. The aluminum alloy used is assumed to be Al-9.8 wt % Nd of which wet etching rate is 5.1 nm/s. The effect obtained by the molybdenum-zirconium alloy and the molybdenum-hafnium alloy described above is also obtained by a molybdenum-zirconium-hafnium ternary alloy. In some cases, a properly low wet etching rate may rather be better in the tapering control depending on the wet etching conditions and the constitution of the layered film. In such a case, an appropriate amount of chromium may be added to the molybdenum-zirconium alloy and the molybdenum-hafnium alloy for controlling the wet etching rate.

In the case of the molybdenum-titanium alloy, the dry etching rate decreases slightly largely compared with the decrease of the wet etching rate, in comparison with the molybdenum-chromium alloy. The molybdenum-titanium alloy is therefore applicable to the purpose of the present invention although the effect is not so great as that provided by the molybdenum-zirconium alloy and the molybdenum-hafnium alloy. The required amount of titanium is 2.3 wt % or more for gate lines and 3.4 wt % or more for drain lines. The amount of titanium required for obtaining a wet etching rate equal to or higher than that of the aluminum alloy is 6.7 % or less. The amount of titanium required for securing a sufficient margin of tapering control is 4.0 wt % or less. The molybdenum-titanium alloy has an additional effect of securing good electrical contact with the aluminum alloy even when the molybdenum-titanium alloy is formed on the aluminum alloy that is covered with an atmospherically generated oxide film. This is due to the ability of titanium of taking the oxygen out of the aluminum oxide. Therefore, when the layered structure is composed of an aluminum alloy and a molybdenum-titanium alloy, it is not necessarily required to form these layers sequentially in the vacuum state. This serves to ease restraint in production. It should be understood that the molybdenum-chromium alloy fails to satisfy securing the dry etching resistance when used for drain lines and securing a sufficient margin of tapering control simultaneously by the shower method.

The second means for solving the first and second challenges simultaneously is to form interconnections by adjusting the composition of an etchant for one-time etching of the aluminum alloy and the second conductive layer. Specifically, the mixed etchant of phosphoric acid ($H_3PO_4$), nitric acid ($HNO_3$), acetic acid ($CH_3COOH$), and water ($H_2O$) is adjusted to include the nitric acid in the range between 7 mol % and 12 mol % inclusive and at least one of ammonium fluoride ($NH_4F$) and Hydrogen fluoride (HF) in a trace amount of 0.01 to 0.1 mol %. The presence of nitric acid at the above concentration causes the ends of a resist pattern to roll up. This serves to increase the etching rate of the second conductive layer on the portions in contact with the resist (side etching rate), and thus allows for etching into a tapered sectional shape by the shower method. The addition of a trace amount of ammonium fluoride or hydrogen fluoride minimizes generation of etching residues on the surface of the aluminum alloy. In addition, in-plane uniformity of the tapered shape is improved by shaking shower nozzles of an etching apparatus . By using the etchant with the above composition for shower etching, tapering is possible even when the wet etching rate of the molybdenum alloy is 3.8 nm/s, a little lower than that of the aluminum alloy. To obtain this wet etching rate, the upper limit of the amount of the added element to molybdenum is 3.0 wt % for chromium, 26 wt % for zirconium, 41 wt % for hafnium, and 7.6 wt % for titanium.

The third challenge can be solved by using an aluminum alloy containing neodymium in an amount of 0.2 at % or more, preferably 2 at % or more. In the case where the layered structure is used for the gate lines, the second conductive layer is not required in the pixel portions of the gate lines, but only required in the terminal portions thereof for securing connection with the pixel electrodes. Therefore, in the pixel portions, the aluminum alloy may be anodized. This minimizes the coverage failure of the insulating film due to hillocks generated on the aluminum alloy and the like. In the case where the layered structure is used for the drain lines, a third conductive layer may be formed under the aluminum alloy layer to secure contact with the underlying semiconductor layer. In this case, amorphous indium tin oxide (a-ITO) or indium zinc oxide (IZO) that allows for use of a weak-acid etchant is preferably used as the material of the pixel electrodes so that the aluminum alloy is prevented from being damaged during etching of the pixel electrodes. If the aluminum alloy and the second conductive layer are shared between the gate lines and the drain lines, the number of sputtering targets required for fabrication of the array substrate of the liquid crystal display device is reduced, and the degree of freedom in the operation of the sputtering apparatus improves, providing an advantage in the aspect of production. If the third conductive layer for the drain lines is also shared, the effect will become greater. Alternatively, the drain lines may be composed of a single molybdenum alloy layer. This constitution having no aluminum alloy eliminates the necessity of considering possible damage on the interconnections during etching of the pixel electrodes, allowing for use of polycrystalline indium tin oxide (poly-ITO) having high reliability as the pixel electrodes. As the molybdenum alloy used as a single layer, a molybdenum-chromium alloy is suitable since it exhibits both high dry etching resistance and low resistivity. The required dry etching resistance is such that the etching selectivity ratio of SiN to the Mo alloy is 3.5 or more. The amount of chromium necessary to satisfy this requirement is 0.35 wt % or more.

In the case where the layered film of a Mo-8 wt % Zr alloy and an Al—Nd alloy according to the present invention is used for gate lines (gate lines), the upper Mo-8 wt % Zr alloy layer may be removed electrochemically and the Al—Nd alloy may be anodized to selectively form an aluminum oxide layer as the upper layer of the gate lines. This greatly improves reliability of the insulation and resistance of the gate insulating film.

DESCRIPTION OF THE PREFERRED EMBODIMENTS

Hereinafter, the present invention will be described by way of example with reference to the relevant drawings.

Example 1

Figure 1:
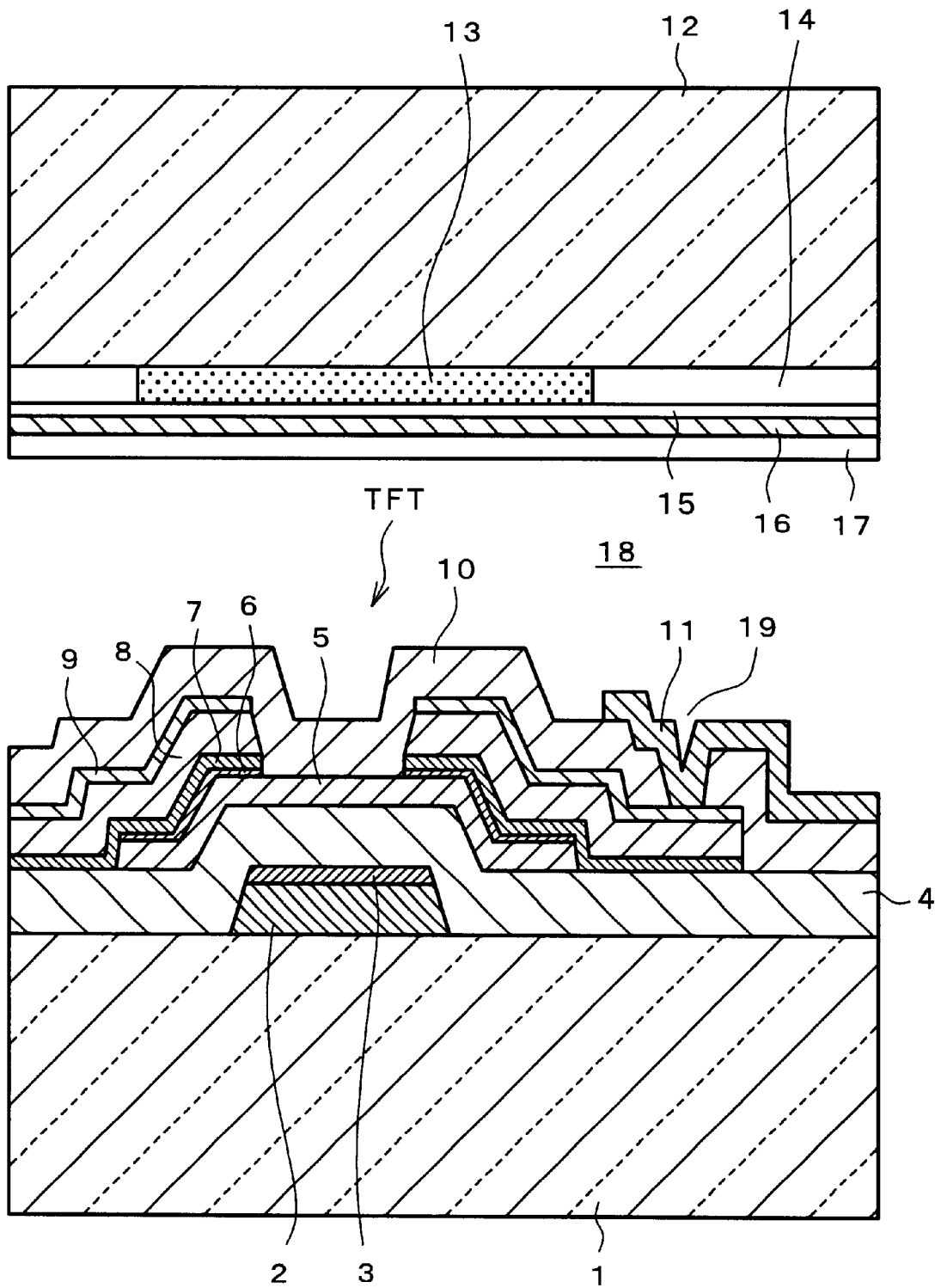
FIG. 1 is a schematic cross-sectional view of a portion of a liquid crystal display device according to the present invention.
Figure 2:
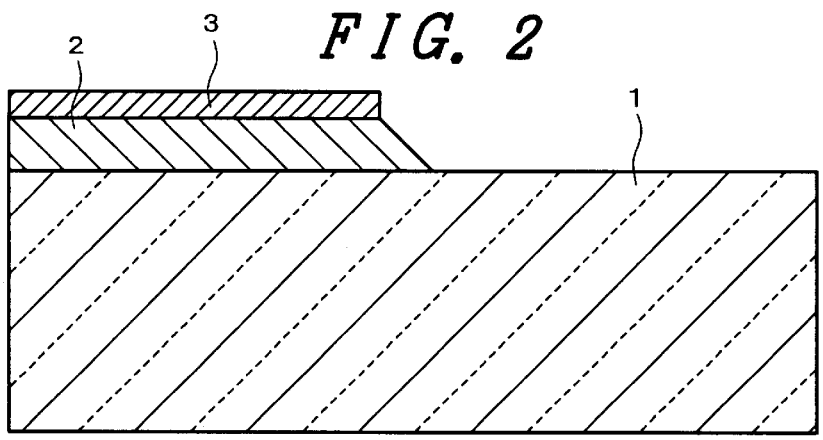
FIG. 2 is a schematic cross-sectional view illustrating a two-layer structure adopted in the liquid crystal display device according to the present invention.
Figure 3:
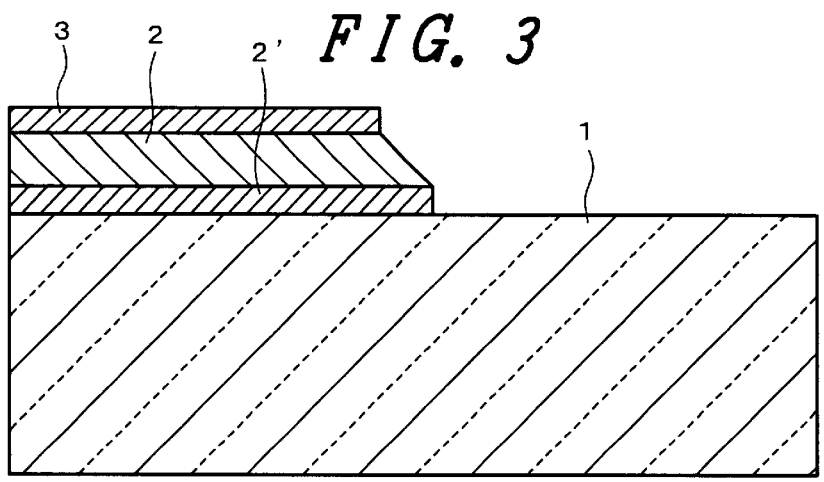
FIG. 3 is a schematic cross-sectional view illustrating a three-layer structure adopted in the liquid crystal display device according to the present invention.
Figure 4:
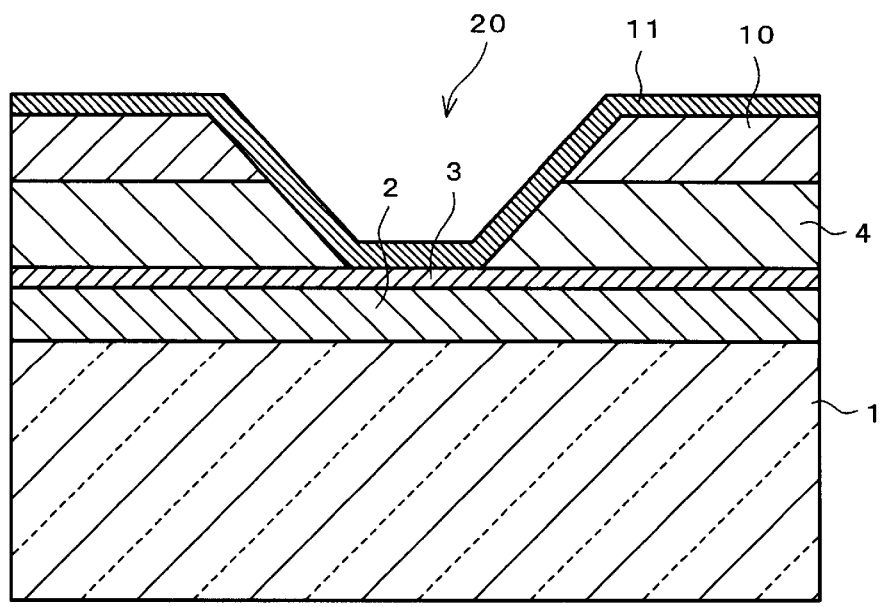
FIG. 4 is a schematic cross-sectional view illustrating a structure at a terminal of a gate line of the liquid crystal display device according to the present invention.

FIG. 1 is a schematic cross-sectional view illustrating a portion of an example of the liquid crystal display device according to the present invention. The liquid crystal display device of this example includes: an active matrix substrate having thin film transistors (TFTs) and the like formed on a surface of a glass substrate 1; a color filter substrate having color filters 14 and the like formed on a surface of a glass substrate 12; and a liquid crystal layer 18 sandwiched by these substrates. FIG. 2 is a schematic cross-sectional view illustrating a layered structure of a gate line according to the present invention, while FIG. 3 is a schematic cross-sectional view illustrating a three-layer structure of an interconnection according to the present invention. FIG. 4 shows a structure of the gate line at an end thereof apart from the TFT, constituting a line terminal.

More specifically, referring to FIG. 1, in the active matrix substrate, an aluminum—9.8 wt % neodymium (Al-9.8 wt % Nd) alloy is deposited as an aluminum layer 2 and subsequently a molybdenum—8 wt % zirconium (Mo-8 wt % Zr) alloy is deposited as a molybdenum layer 3 on the inner surface of the glass substrate 1 by sputtering at a temperature of 120° C. A resist pattern for gate lines is then formed by photolithography, and the deposited layers are wet-etched at one time by the shower etching method with an etchant of an aqueous solution including phosphoric acid, nitric acid, acetic acid, and ammonium fluoride. By employing the shower etching method, even a large-area substrate can be etched with high size precision. The composition of the etchant is adjusted so that the etching rate of the Mo-8 wt % Zr alloy is four times as high as that of the Al-9.8 wt % Nd alloy, as will be described later, so as to have tapered sides of the gate line as shown in FIG. 2. Alternatively, as shown in FIG. 3, the gate line may be formed by sequentially depositing a molybdenum—8 wt % zirconium (Mo-8 wt % Zr) alloy layer 2', an aluminum—neodymium (Al—Nd) alloy 2, and a molybdenum—8 wt % zirconium (Mo-8 wt % Zr) alloy 3 to form a three-layer structure. Although this structure is complicate compared with the two-layer structure, it has been experimentally confirmed that formation of the tapered shape of the layered structure becomes stable when the lower Mo layer exists. This is due to the large difference in etching state between Al and Mo. Etching of the upper Mo layer proceeds stably under the existence of the lower Mo layer.

After the etching for the gate lines and removal of the resist, a gate insulating layer 4 made of SiN, an i–a-Si layer 5, and an n+a-Si layer 6 are sequentially deposited by plasma CVD. As in the etching of the gate lines, a resist is applied and the i–a-Si layer 5 and the n+a-Si layer 6 are dry-etched to form a-Si islands. After removal of the resist for etching the a-Si layers, a molybdenum—8 wt % zirconium (Mo-8 wt % Zr) alloy layer 7, an aluminum—9.8 wt % neodymium (Al-9.8 wt % Nd) alloy 8, and a molybdenum—8 wt % zirconium (Mo-8 wt % Zr) alloy 9 are sequentially deposited to form a three-layer structure similar to that shown in FIG. 3. A resist for source/drain electrodes are then formed by photolithography. As in the etching for the gate lines, the deposited layers are etched at one time with a mixed acid etchant including phosphoric acid, nitric acid, acetic acid, and water. When the etchant of phosphoric acid containing nitric acid is used, the etching rate of pure molybdenum (Mo) is ten times or more as high as that of aluminum (Al). Therefore, a pure molybdenum layer will be etched too fast, failing to provide a good shape. To overcome this problem, zirconium (Zr), hafnium (Hf), titanium (Ti), tantalum (Ta), or the like is appropriately added to molybdenum (Mo) forming an alloy to reduce the etching rate to a level of one to four times as high as, preferably twice as high as, the etching rate of aluminum.

Figure 5:
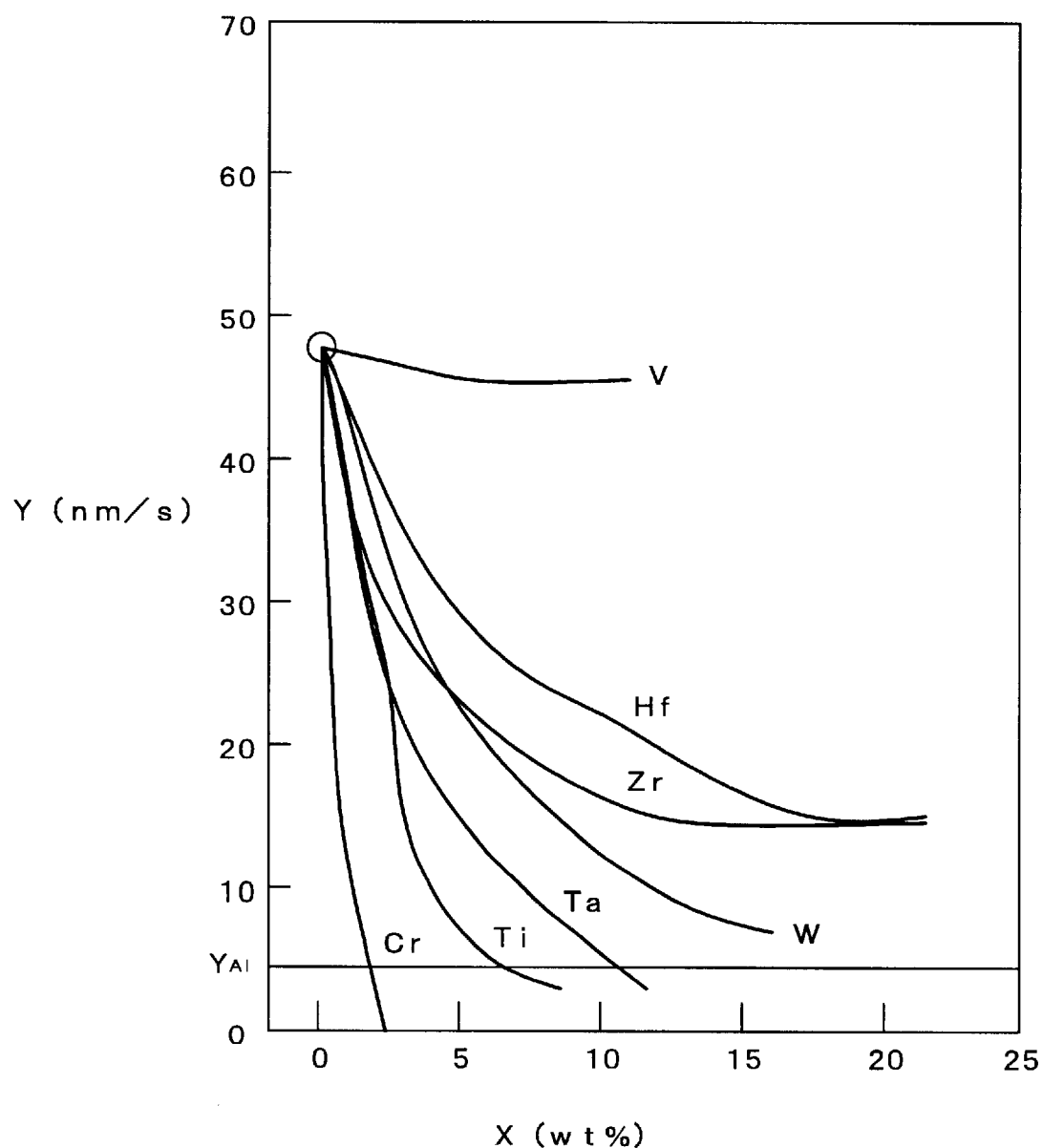
FIG. 5 is a graph showing the dependency of the wet etching rate of a metal alloy layer on the amount of an added element in the alloy.

FIG. 5 is a graph showing the dependency of the wet-etching rate of the metal layer on the amount of the added elements. In FIG. 5, the dependency on the amount of tungsten (W) added to molybdenum is also shown for reference. As is observed from FIG. 5, the etching rate of the molybdenum alloy can be appropriately higher than that of aluminum (Al) by adding an amount of 2 wt % for chromium (Cr) and an amount of 5 to 20 wt % for titanium (Ti) and tantalum (Ta). In addition, the sides of the three-layer structure interconnections can be tapered by adjusting the composition of the mixed acid etchant described above.

A long etching time is required for the sequential etching of the layered structure. Troubles arising from the prolonged etching time are avoided by adding titanium to molybdenum since titanium contributes to greatly improving the adhesion of the molybdenum alloy to the resist. If pure molybdenum is used, a surface oxide film tends to be easily dissolved in a developer resulting in forming fine cavities at the interface between the resist and the layered structure. The etchant may infiltrate in the cavities, causing local narrowing or disconnection of interconnections. By adding titanium, however, titanium is oxidized to become titanium oxide, which decomposes contaminants on the surface enhancing the hydrophilicity of the surface. This avoids local spotting of water and prevents an occurrence of disconnection due to failure in adhesion to the resist. The same effect is also obtained by using zirconium (Zr), hafnium (Hf), and chromium (Cr), which stabilize oxides.

Thereafter, the n+a-Si layer 6 is dry-etched using the source/drain lines as a mask to form a channel. Silicon nitride (SiN) is then deposited by CVD at 230° C. to form a passivation layer 10. A through hole is formed on each terminal of the gate lines and the drain lines. The through hole on the terminal of the drain line is shown by the reference numeral 19 in FIG. 1, while the through hole on the terminal of the gate line is shown by the reference numeral 20 in FIG. 4. As shown in FIG. 4, the through hole 20 for the gate line is formed through both the passivation layer 10 and the gate insulating layer 4. In this example, using one photomask for a through hole pattern, the two layers are etched simultaneously by dry etching. In this etching, the passivation layer 10 and the gate insulating layer 4 are etched so as to form a tapered-wall hole. This is done by forming a layer having a high etching rate in the top portion of the passivation layer 10 so that the top layer can be side-etched faster than the other portion. Since the total thickness of the passivation layer 10 and the gate insulating layer 4 is larger than the thickness of the TFT portion shown in FIG. 1, the through hole 20 to be formed on the gate line terminal is deep than the through hole 19 to be formed on the drain/source electrode. This indicates that the through hole 19 is completed while the formation of the through hole 20 is still underway, resulting in that the underlying electrode, that is, the layered structure of the aluminum alloy layer 8 and the molybdenum alloy layer 9, at the bottom of the through hole 19 is exposed to the dry etching atmosphere for a prolonged period of time. If the upper layer of the source electrode is pure molybdenum, which has a high etching rate, the aluminum layer underlying the molybdenum layer may be exposed. In order to increase the dry-etching resistance of the molybdenum layer, an appropriate element may be added.

Figure 6:
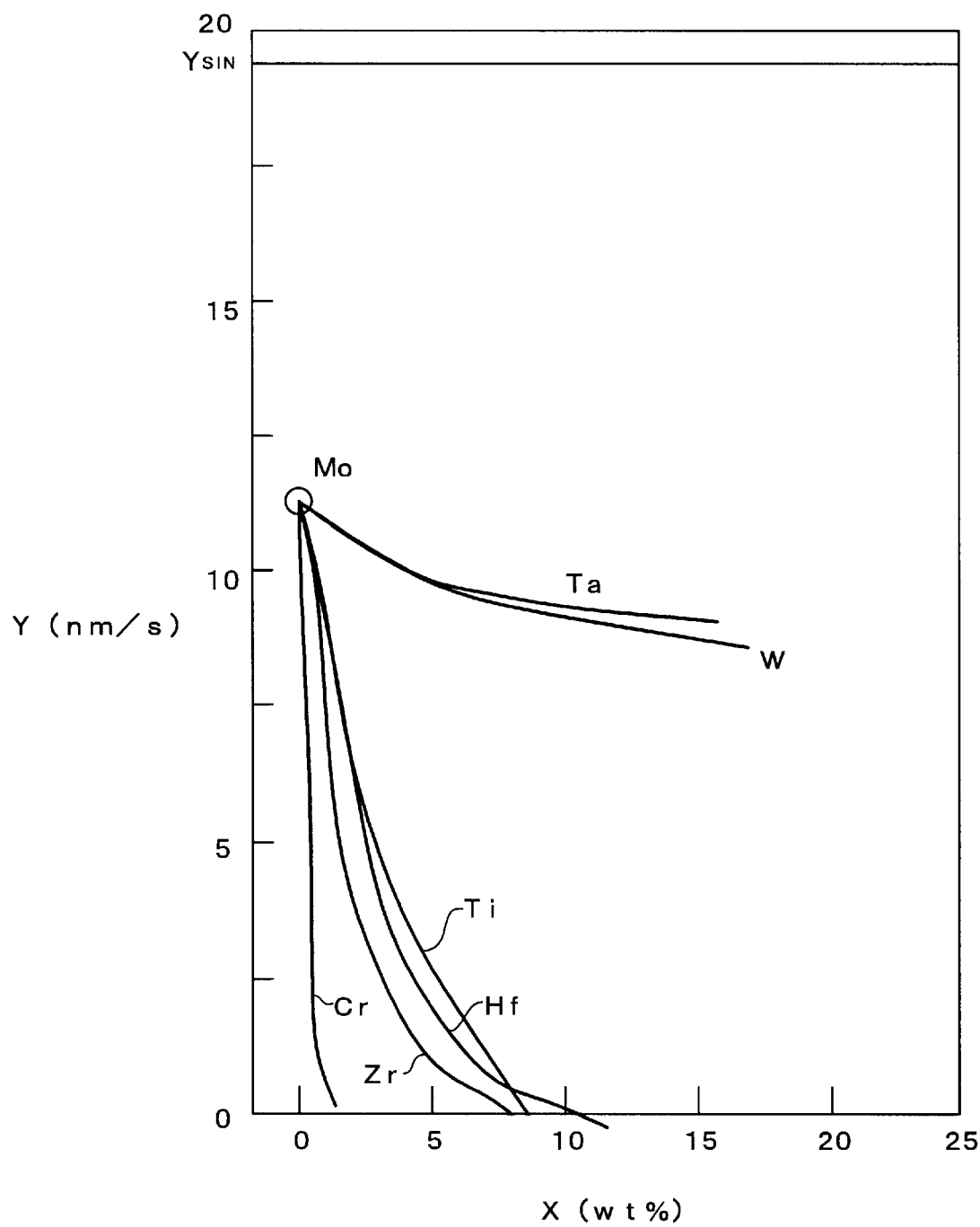
FIG. 6 is a graph showing the dependency of the dry etching rate of a metal alloy layer on amount of an added element in the alloy.

FIG. 6 is a graph showing the dependency of the dry etching rate of the metal layer on the amount of the added elements, that is, shows the dry etching rates of the molybdenum alloys with various elements added thereto. As is observed from FIG. 6, all the examined elements exhibited the effect of lowering the dry etching rate. This effect is obtained presumably because the bonding energy between the elements increases by forming an alloy.

In order to prevent the upper Mo alloy layer of the source/drain line from being etched away by the dry etching, the Mo alloy layer must have a dry etching resistance such that the selectivity ratio of the passivation layer to the Mo alloy is 14, i.e., have a dry etching rate of 1.4 nm/s or less. The dry etching rate of 1.4 nm/s or less is not attainable by Tantalum (Ta) and tungsten (W) even if the added amount thereof is increased, but is attained by adding about 2.5 wt % or more of chromium (Cr), 4 wt % or more of zirconium (Zr), 7.3 wt % or more of hafnium (Hf), or 7 wt % or more of titanium (Ti). In other words, by depositing the molybdenum alloy including any of the above elements on the aluminum layer, the aluminum layer is prevented from being exposed at the bottom of the through hole for the source/drain line terminal. After the formation of the through hole, an indium tin oxide (ITO) film 11 that is to be a pixel electrode on the source/drain electrode is formed covering the through hole. Both the gate and drain line terminals can secure good contact with the ITO film 11 formed thereon. This ensures connection stability at the interconnection terminals and, as a result, improves the reliability of the resultant liquid crystal display device. As the ITO film 11, an amorphous ITO film is formed at room temperature by adding a small amount of water during sputtering. By adopting the amorphous ITO film, 3 % oxalic acid that is a weak acid can be used when the ITO film is etched. By using the weak acid, sufficient selectivity of the ITO film against the Al layer of the layered structure underlying the ITO film is secured during the etching of the ITO film. In place of the weak acid, a mixed acid of hydrochloric acid, nitric acid, and water that is an oxidizing etchant capable of forming a surface oxide film on the Al layer may be used. In place of the amorphous ITO film, an amorphous indium zinc oxide (IZO) may be used as the amorphous transparent conductive layer. In the latter case, the layer is formed by sputtering using a mixed gas of argon and oxygen at a temperature between room temperature and 200° C.

Figure 7:
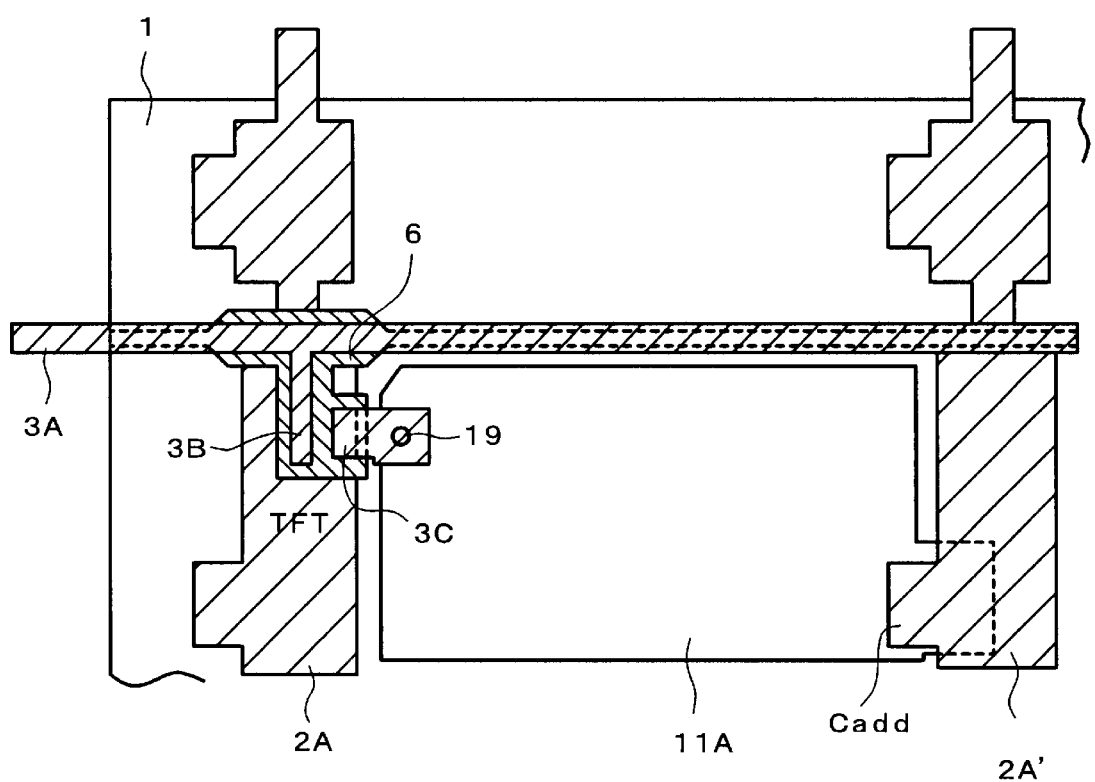
FIG. 7 is a schematic plan view of a pixel region formed on an active matrix substrate of a liquid crystal display device applying the present invention.

Hereinbelow, the constitution of a pixel portion of an active matrix liquid crystal display device applying the present invention will be described with reference to FIG. 7, which is a schematic plan view of one pixel portion formed on an active matrix substrate 1 of the liquid crystal display device. Referring to FIG. 7, the reference numeral 2A denotes a gate line (electrode), 3A denotes a drain line, 3B denotes a drain electrode, 3C denotes a source electrode, 11A denotes a pixel electrode, 5 denotes a semiconductor layer, and 19 denotes a contact hole. It should be understood that the drain line 3A, the drain electrode 3B, and the source electrode 3C are composed of the same layered structure, which are therefore represented together as the source/drain lines (electrodes) in FIG. 1. Also, the drain line (electrode) 3A, 3B and the source line (electrode) 3C may be switched to each other during operation. They are therefore represented as the drain/source lines (electrodes) in the description with reference to FIG. 1. The drain line 3A, the drain electrode 3B, and the source electrode 3C are formed of the layered structure composed of the aluminum alloy layer 8 and the molybdenum alloy layers 7 and 9 shown in FIG. 1. The gate line (electrode) 2A is formed of the layered structure composed of the aluminum alloy layer 2 and the molybdenum alloy layer 3 shown in FIG. 1. Over the entire substrate 1 are formed the gate insulating layer 4 covering the gate line (electrode) 2A for securing insulation of the gate line (electrode) 2A from the drain line 3A, the drain electrode 3B, and the source electrode 3C, as well as the silicon nitride (SiN) layer (see FIG. 1).

The TFT is formed above the gate insulating layer 4 at a corner of a pixel region defined by the adjacent gate electrodes 2A and the adjacent drain lines 3A. In the region of the TFT, the semiconductor layer 5 made of amorphous silicon (a-Si) is formed on the portion of the gate insulating layer 4 located above the gate electrode 2A so as to override the gate electrode 2A. The semiconductor layer 5 underlies the region of the drain electrode 3B and the source electrode 3C. The reasons why the semiconductor layer 5 is formed to underlie the drain electrode 3B and source electrode 3C are to prevent stepping and to reduce the capacitance between these electrodes and the intersecting gate electrode 2A. The drain electrode 3B and the source electrode 3C are formed on the surface of the semiconductor layer 5 in the TFT region so that these electrodes 3B and 3C are located to face each other with the gate electrode 2A therebetween when viewed from top. Contact layers doped with impurities at a high density are formed in the surface portion of the semiconductor layer 5 at the interfaces with the drain electrode 3B and the source electrode 3C although not shown. The impurity contact layers are first formed over the entire surface of the semiconductor layer 5 together with the formation of the semiconductor layer 5, and then the portion thereof uncovered with the drain electrode and the source electrode formed in the later stage is etched using these electrodes as a mask. The drain electrode 3B and the source electrode 3C are formed of the same material in the same process. As is observed from FIG. 7, the source electrode 3C includes a portion extending to the region of the pixel electrode 11A, so as to be in contact with the pixel electrode 11A in this portion. The pixel electrode 11A corresponds to the ITO film 11 in FIG. 1.

Over the entire surface of the thus-processed substrate 1, the passivation layer 10 made of a silicon nitride (SiN) film, for example, is formed to prevent direct contact of the TFT with a liquid crystal material (see FIG. 1). The contact hole 19 is formed through the passivation layer 10 to reach the extended portion of the source electrode 3C. The pixel electrode 11A made of a transparent conductive layer such as an ITO film is formed on the passivation layer 10 in the pixel region. The pixel electrode 11A is therefore electrically connected with the source electrode 3C via the contact hold 19. The pixel electrode 11A extends up to the adjacent gate electrode denoted by 2A' in FIG. 7 for driving an adjacent TFT. This results in forming a storage capacitor Cadd that uses as a dielectric film the layered structure formed by the gate insulating layer 4 and the passivation layer 10 existing between the pixel electrode 11 and the adjacent gate electrode 2A'.

The resultant active matrix substrate 1 having the layers described above formed thereon is bonded with the color filter substrate 12 with the liquid crystal layer 18 therebetween as shown in FIG. 1. On the surface of the color filter substrate 12 facing the liquid crystal layer 18, a plurality of color filters 14 defined by a black matrix 13, a leveling layer 15 covering the color filters 14 and the black matrix 13, and a common electrode 16 made of ITO, for example, shared by all the pixel regions are formed in this order. A protection film 17 is formed on the common electrode 16. Alignment films (not shown) are formed at the interfaces between the protection film 17 and the liquid crystal layer 18 and between the liquid crystal layer 18 and the active matrix substrate 1 for regulating the orientation of the liquid crystal material constituting the liquid crystal layer 18.

With the constitution described above, the respective interconnections (electrodes) can be formed in good states, and the connection stability at the terminals is secured. This improves reliability of the resultant liquid crystal display device.

Figure 8:
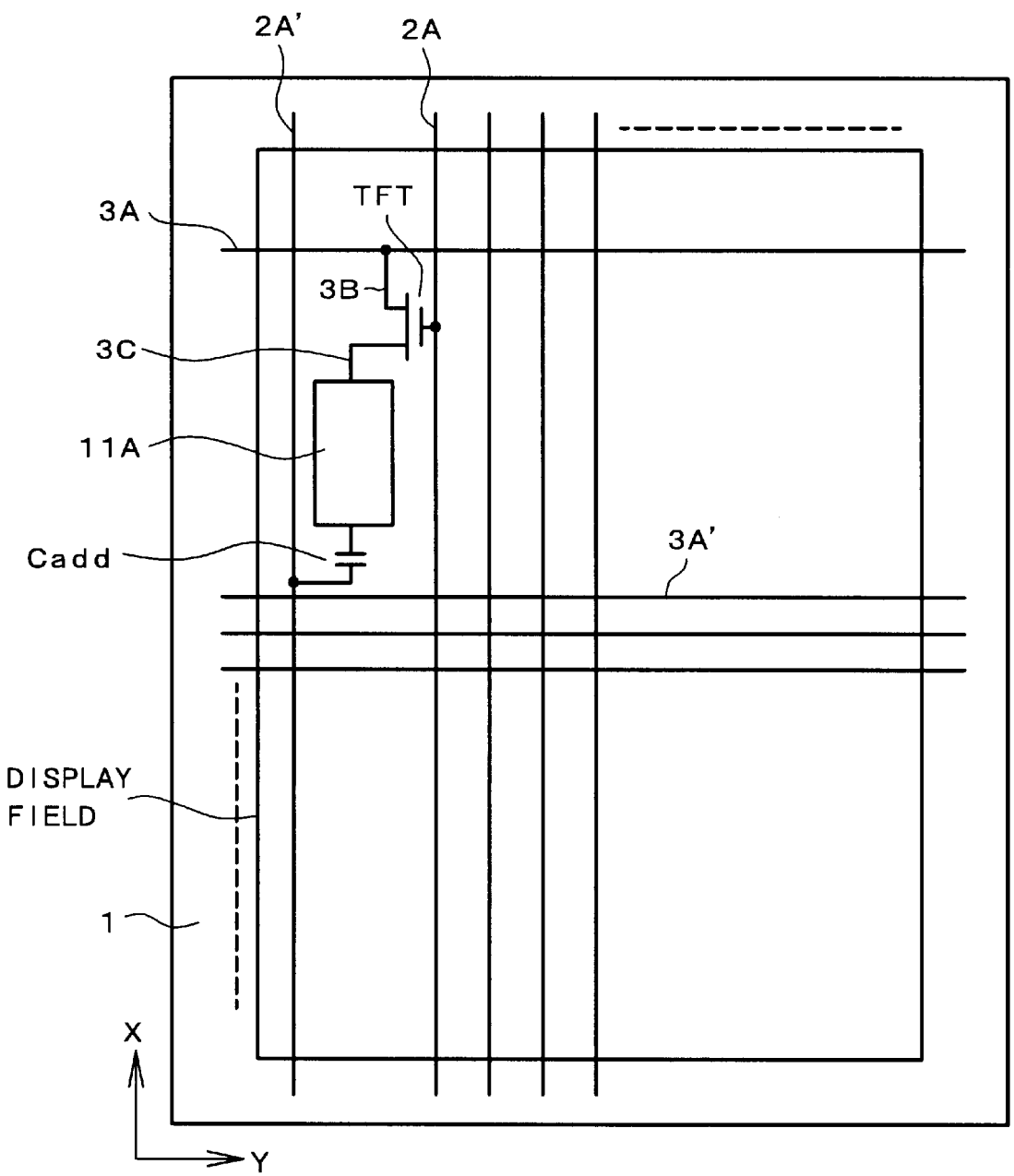
FIG. 8 is a schematic plan view illustrating an interconnection structure focusing on one pixel region formed on an active matrix substrate of a liquid crystal display device applying the present invention.

FIG. 8 is a schematic plan view of the active matrix substrate of the liquid crystal display device applying the present invention, focusing on one pixel portion for understanding of the interconnection structure. In this figure, the same components as those in FIG. 7 are denoted by the same reference numerals. The reference numeral 3A' denotes an adjacent drain line. The substantial portion of the active matrix substrate 1 excluding the peripheries is a display field in which a liquid crystal material is sealed in the space formed with the color filter substrate. The gate lines (2A, 2A') run in the X direction and the drain lines (3A, 3A') run in the Y direction in the display field. The drain electrodes 3B and the source electrodes 3C extend in the Y direction and overlap the gate lines 2A, 2A' in the X direction while being insulated from the gate lines 2A, 2A'. One pixel region is defined by the gate lines 2A and 2A' and the drain lines 3A and 3A'. The display field is thus composed of a plurality of such pixel regions arranged in a matrix. Each pixel region includes: the TFT that is activated upon receipt of a scanning signal supplied from the gate line 2A; and the pixel electrode 11A that receives an image signal from the drain line 3A via the activated TFT. The pixel region also includes the storage capacitor Cadd formed between the pixel electrode 11A and the adjacent gate line 2A' that is not the gate line for driving the TFT in question. The storage capacitor Cadd is formed so as to prolong the storage of the image signal in the pixel electrode 11A after the TF is inactivated. In the liquid crystal display device with the above constitution, the interconnections for selecting the pixels are formed on the substrate 1 by respective film formation methods and patterning methods in a manner as described above.

Figure 9:
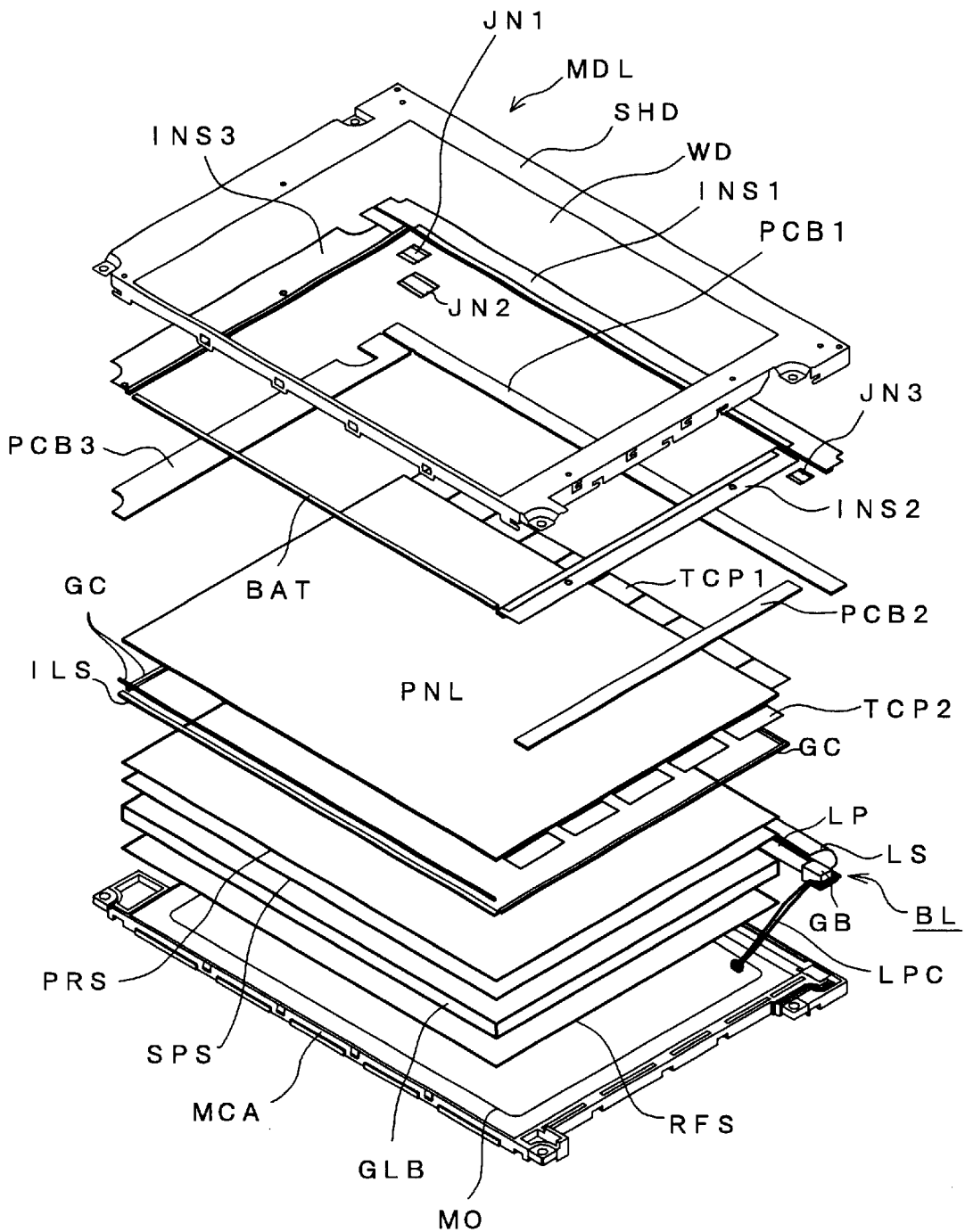
FIG. 9 is an exploded perspective view illustrating the entire constitution of an active matrix liquid crystal display device applying the present invention.

FIG. 9 is an exploded perspective illustration of the entire constitution of the active matrix liquid crystal display device applying the present invention. This figure illustrates a concrete structure of the liquid crystal display device of the present invention (that is, an integrated liquid crystal module composed of a liquid crystal display panel, a circuit board, a backlight, and other components, which is hereinafter referred to as MDL). Referring to FIG. 9, SHD denotes a shield case (also called a metal frame) made of a metal plate; WD denotes a display window, INS1 to 3 denote insulating sheets; PCB1 to 3 denote circuit boards (PCB1: a drain-side circuit board for driving drain lines, PCB2: a gate-side circuit board for driving gate lines, PCB3: an interface circuit board); JN1 to 3 denote joiners for electrically connecting the circuit boards PCB1 to 3; TCP1 and TCP2 denote tape carrier packages; PNL denotes a liquid crystal panel; GC denotes a rubber cushion; ILS denotes a light-shading spacer; PRS denotes a prism sheet; SPS denotes a diffusion sheet; GLB denotes a light guide plate; RFS denotes a reflection sheet; MCA denotes an integrally molded lower case (mold frame); MO denotes an opening of the MCA; LP denotes a fluorescent tube; LPC denotes a lamp cable; GB denotes a rubber bush for supporting the fluorescent tube LP; BAT denotes a double-sided adhesive tape; and BL denotes a backlight composed of the fluorescent tube, the light guide plate, and the like. These components are assembled in the positional relationship shown in FIG. 9 to complete the MDL. The MDL includes two storing/holding members, i.e., the shield case SHD and the lower case MCA. The SHD holds fixedly therein the insulating sheets INS1 to 3, the circuit boards PCB1 to 3, and the liquid crystal display panel PNL. The MCA holds therein the backlight BL composed of the fluorescent tube LP, the light guide plate GLB, the prism sheet PRS, and the like. These storing/holding members are bonded together to form the MDL.

On the drain-side circuit board PCB1 for driving drain lines, integrated circuit chips for driving pixels of the liquid crystal display panel PNL are mounted. On the interface circuit board PCB3, integrated circuit chips for receiving image signals from an external host and control signals such as a timing signal, a timing converter TCON for processing the timing signal to generate a clock signal, and other chips are mounted. The clock signal generated by the timing converter is supplied to the integrated circuit chips mounted on the drain-side circuit board PCB1 via clock signal lines CLL on the PCB3 and PCB1. The drain-side circuit board PCB1 and the interface circuit board PCB3 are multilayer wiring boards. The clock signal lines CLL are formed as inner-layer lines of the PCB1 and PCB3. The liquid crystal panel PNL is essentially composed of a TFT substrate having TFTs and interconnections/electrodes formed thereon and a color filter substrate having color filters formed thereon. These substrates are bonded together with a liquid crystal material sealed therebetween. To the liquid crystal panel PNL, the drain-side circuit board PCB1, the gate-side circuit board PCB2, and the interface circuit board PCB3 are connected via the tape carrier packages TCP1 and TCP2. The circuit boards are connected to one another with the joiners JN1 to 3.

By adopting the above constitution, the fabrication process of the interconnections and electrodes of the liquid crystal panel can be shortened, and troubles such as disconnection can be reduced, providing a liquid crystal display device with high reliability. The present invention is applicable, not only to the TFT type liquid crystal display device described above, but also to other types of liquid crystal display devices and patterning processes of interconnections and electrodes of semiconductor elements other than those described above.

Example 2

Figure 10:
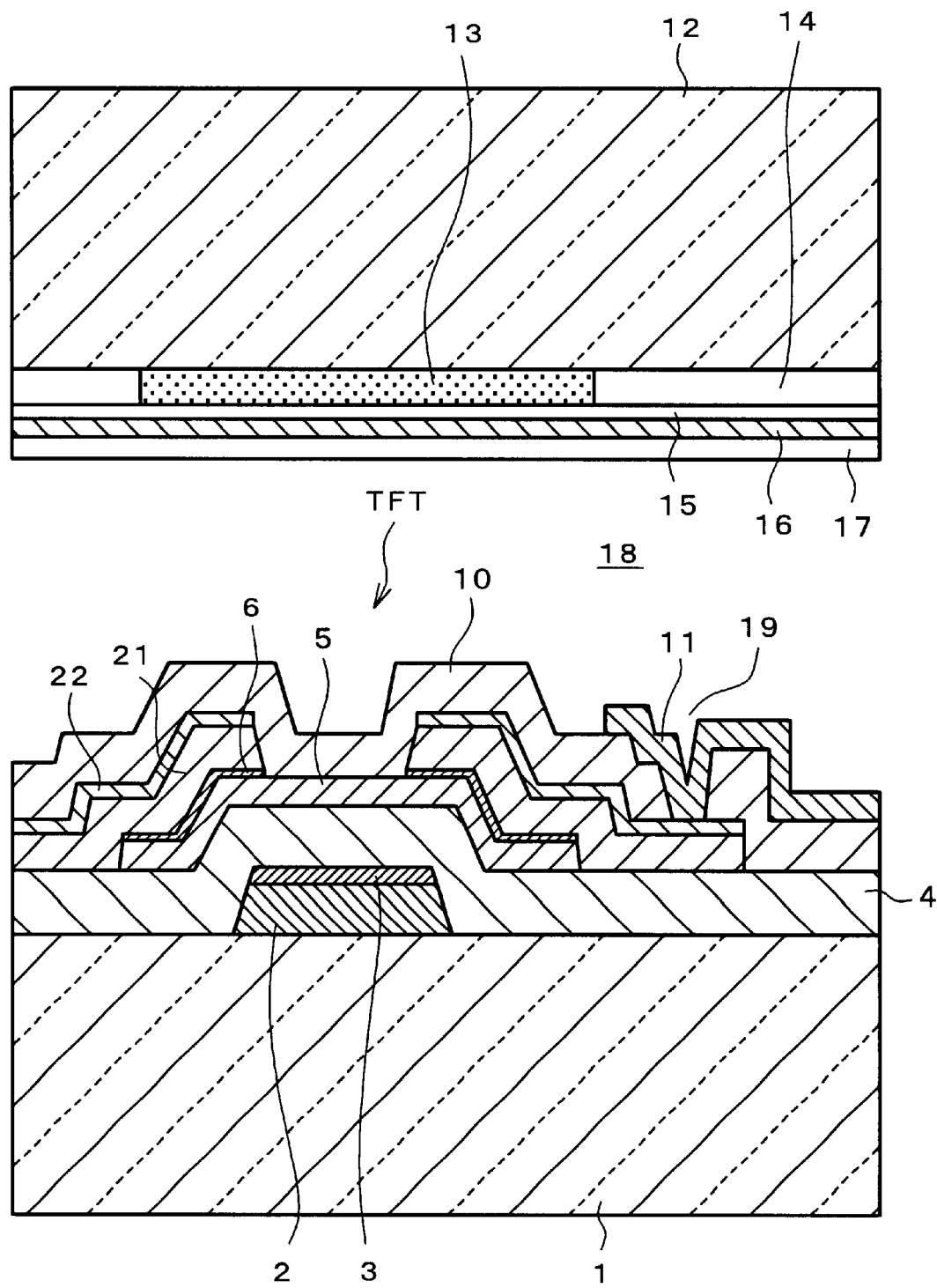
FIG. 10 is a schematic cross-sectional view of a portion of another liquid crystal display device according to the present invention.

FIG. 10 is a schematic cross-sectional view illustrating a portion of another example of the liquid crystal display device according to the present invention.

The liquid crystal display device of this example includes: an active matrix substrate having TFTs and the like formed on a surface of a glass substrate 1; a color filter substrate having color filters 14 and the like formed on a surface of a glass substrate 12; and a liquid crystal layer 18 sandwiched by these substrates. As in Example 1, the gate lines are formed of the layered structure of Mo-8 wt % Zr and Al-9.8 wt % Nd. Also, as in Example 1, after the gate lines are formed by etching and a resist is removed, a gate insulating layer 4 made of SiN, an i–a-Si layer 5, and an n+a-Si layer 6 are sequentially deposited by plasma CVD. A resist is then applied and the i–a-Si layer 5 and the n+a-Si layer 6 are dry-etched to form a-Si islands.

After removal of the resist, a Cr layer 21 and a Cr-30 wt % Mo layer 22 are sequentially deposited to form a two-layer structure for source/drain lines as shown in FIG. 10. A resist for source/drain electrodes is then formed by photolithography. Using this resist, the two-layer structure is wet-etched by the shower etching method with an etchant including ceric ammonium nitrate, nitric acid, and water. In place of nitric acid, perchloric acid may be added. By using this etchant, the upper Cr-30 wt % Mo alloy layer is etched faster than the Cr layer due to the difference in corrosion potential between the two layers. This allows for control of the sectional shape of the interconnections to have a taper angle of about 50°. The n+a-Si layer 6 is then dry-etched using the source/drain lines as a mask, to form channel portions.

Thereafter, silicon nitride (SiN) is deposited at 230° C. to form a passivation layer 10. A through hole is then formed on each terminal of the gate lines and the drain lines. As for the terminal of the gate line, a through hole is formed through the passivation layer 10 and the gate insulating layer 4 as shown in FIG. 4. In this example, these two layers are dry-etched simultaneously using the same photomask having a through hole pattern to form through holes. The passivation layer 10 and the gate insulating layer 4 are etched so as to form a tapered-wall hole. This is done by forming a layer having a high etching rate in the top portion of the passivation layer 10 so that the top layer can be side-etched faster than the other portion. In this etching, the Cr-30 wt % Mo/Cr layered structure of the source/drain terminals allows SiN to have a large selectivity ratio of 100 or more for the dry etching with SF6 gas. Accordingly, during the formation of the through hole 20 through the SiN two layers of the passivation layer 10 and the gate insulating layer 4 at each gate terminal as shown in FIG. 4, the Cr-30 wt % Mo/Cr layered structure of the source/drain electrode exposed at the bottom of the through hole 19 shown in FIG. 10 is prevented from being etched. As the interconnections, a single layer made of a Mo alloy such as Mo—Ti, Mo—Zr, Mo—Hf, Mo—Cr, Mo—W, and Mo—V can be used if such an alloy has a sufficiently high dry etching resistance and a reduced specific resistance as the Cr alloy has. In this case, such a single Mo alloy layer may be etched using a wet etchant including phosphoric acid, nitric acid, acetic acid, and water as in Example 1.

After the formation of the through holes, an indium tin oxide (ITO) film is formed by sputtering as the pixel electrodes and also as a protection film for the gate terminals and source/drain terminals. Specifically, a polycrystalline ITO (poly-ITO) film is formed using an argon-oxygen mixed gas at 230° C. Unlike the amorphous ITO film, the poly-ITO film is not easily wet-etched with a weak acid, and thus a strong acid such as aqua regia containing a high concentration of hydrochloric acid, and hydrobromic acid (HBr) is used. If wet etching is made at 40° C. using HBr, in particular, the side-etching amount beyond the resist is reduced and thus etching with high size precision is possible. However, since a strong acid is used, it is difficult to use an Al film for the source/drain lines underlying the passivation layer. Therefore, when an Al film is used for the source/drain lines as in Example 1, a passivation layer made of an organic film may be added to the constitution shown in FIG. 10 for improving the resistance of the passivation layer 10 against the etchant for the ITO film. The poly-ITO film can provide good contact with the underlying metal layer, securing the connection stability at the terminals of the interconnections and thus improving the reliability of the resultant liquid crystal display device.

For example, the contact resistance between the ITO film and the Cr-30 wt % Mo layer in the through hole 19 shown in FIG. 10 can be reduced to 2000 $\Omega\mu m^2$. If the amount of Mo is increased to form a Cr-50 wt % Mo layer, the contact resistance can be further reduced to 800 $\Omega\mu m^2$. The contact resistance between the poly-ITO film and the Mo-8 wt % Zr layer in the through hole 20 shown in FIG. 4 can be even as low as 400 $\Omega\mu m^2$. Further, by using the poly-ITO film, the contact resistance against bumps of driver ICs made of an anisotropic conductive film can be reduced. Moreover, a change in contact resistance with time can be minimized compared with the amorphous ITO film, thereby greatly increasing the stability. With the reduced ITO/metal interconnection and ITO/anisotropic conductive film contact resistances, IC packaging becomes easier and more reliable.

Figure 11:
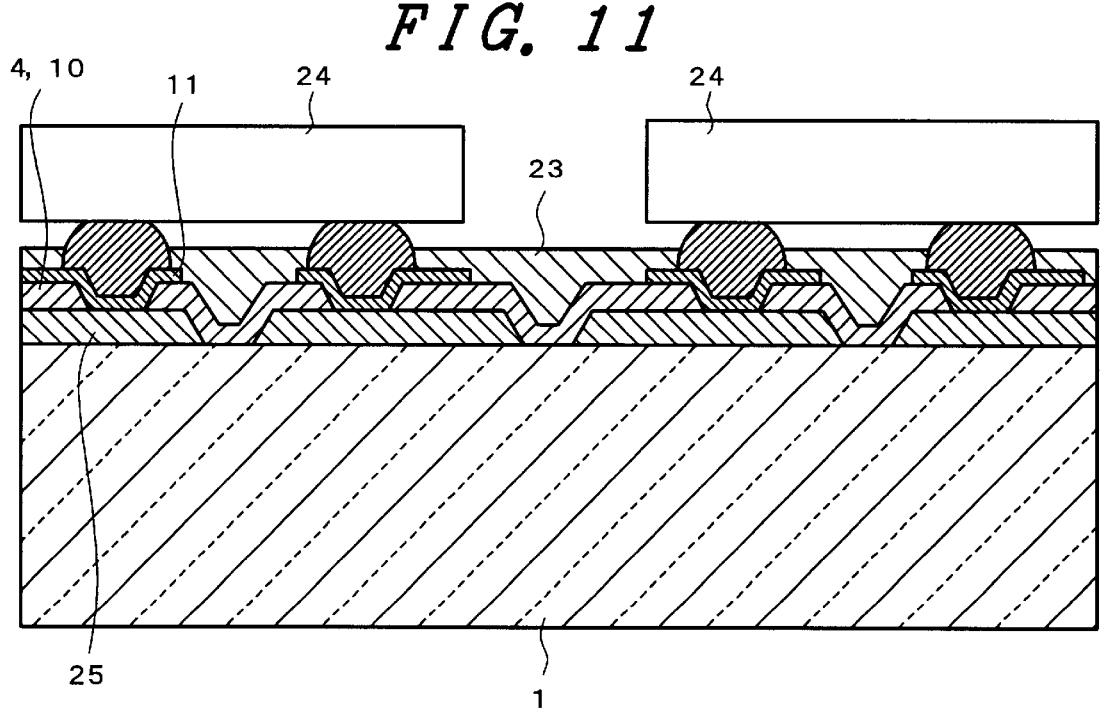
FIG. 11 is a schematic cross-sectional view of a driver IC mounting region of a liquid crystal display device according to the present invention.
Figure 12:
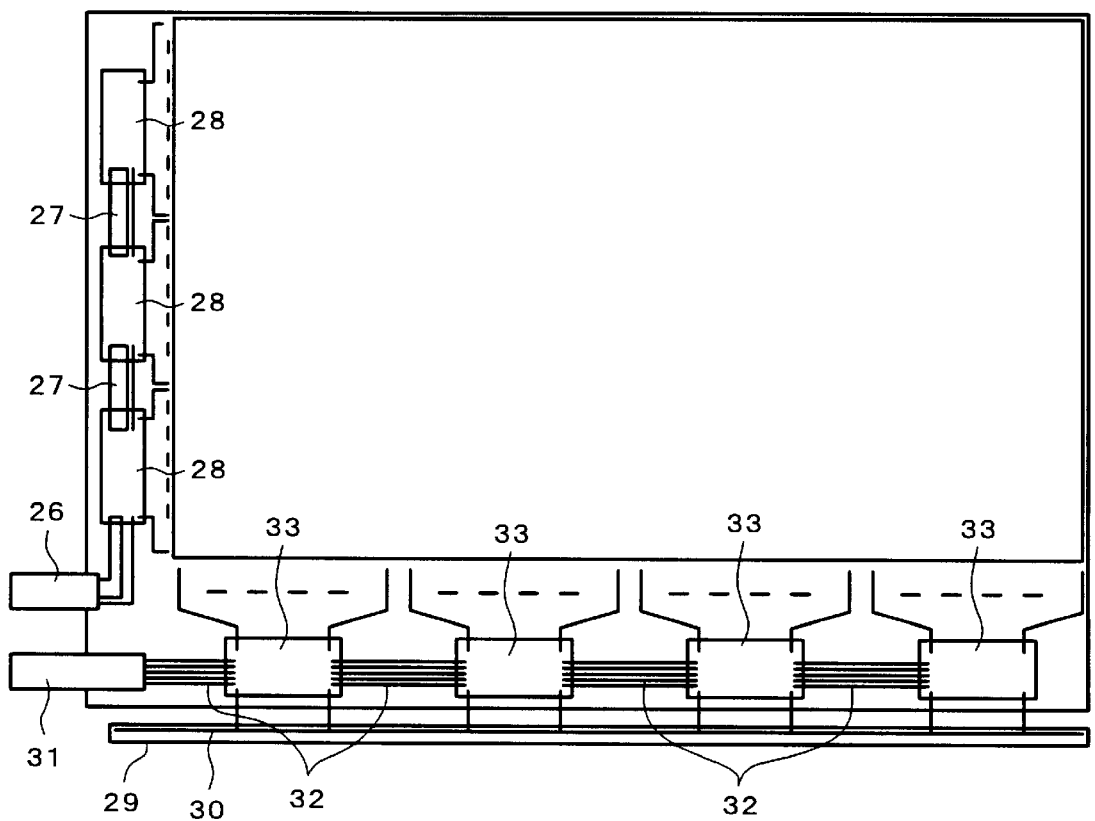
FIG. 12 is a plan view of a driver IC mounting region of a liquid crystal display device according to the present invention.

Referring to FIGS. 11 and 12, examples of IC packaging will be described, where signals are transferred sequentially among gate driver IC chips and/or drain driver IC chips, thereby simplifying the connection with flexible printed circuits (FPC) while improving the connection reliability. FIG. 11 is a cross-sectional view of a glass substrate 1 on which driver Ics 24 are mounted via an anisotropic conductive film (ACF) 23 by a chip-on-glass (COG) method. Requirements for realizing data transfer among the ICs are as follows. First, an aluminum layer should be used for bus lines to secure low resistance. Secondly, a Mo-8 wt % Zr layer should be used as an overlying film of the Al layer and a poly-ITO film be used as a connecting film under soldering balls of the IC chips, to ensure low contact resistance against the driver ICs. By selecting such materials for the interconnections and the terminal films, the sheet resistance of the bus lines is 0.3 $\Omega\mu$/sq, the contact resistance between the ITO film and the Mo-8 wt % Zr layer is reduced to 400 $\Omega\mu m^2$, and the contact resistance between the ITO film and the anisotropic conductive particles is stabilized at a low level. With such low interconnection resistance and contact resistance, it becomes possible to connect adjacent driver IC chips 24 with each other via a bus line 25 that is a thin film line formed on the TFT substrate, so that the power and signals conventionally supplied from the FPC to respective driver ICs can be sequentially transferred to the subsequent driver ICs.

FIG. 12 shows an exemplified layout of bus lines, FPCs, and driver ICs where the data transfer method is applied to both gate and drain bus lines. Referring to FIG. 12, a scanning signal and a gate driver power supply voltage are supplied from a gate driver FPC 26 to gate driver Ics 28 via gate power bus lines and scanning signal bus lines 27. The data is sequentially transferred among the Ics 28 while being written in the subsequent Ics 28. As for the drain bus lines that carry a large load, a drain driver power supply voltage is supplied from a power supply FPC 29 via a power bus line 30. A data signal is supplied from a data signal FPC 31 and sequentially transferred among drain driver Ics 33 via data transfer bus lines 32, and thus the drivers are sequentially driven. By employing this method, the gate FPC is eliminated and the drain FPC can be minimized. This greatly improves the connection reliability and realizes a narrow-frame display. Also, by the reduction in scale of the FPC, the fabrication cost can be reduced.

Example 3

Figure 13:
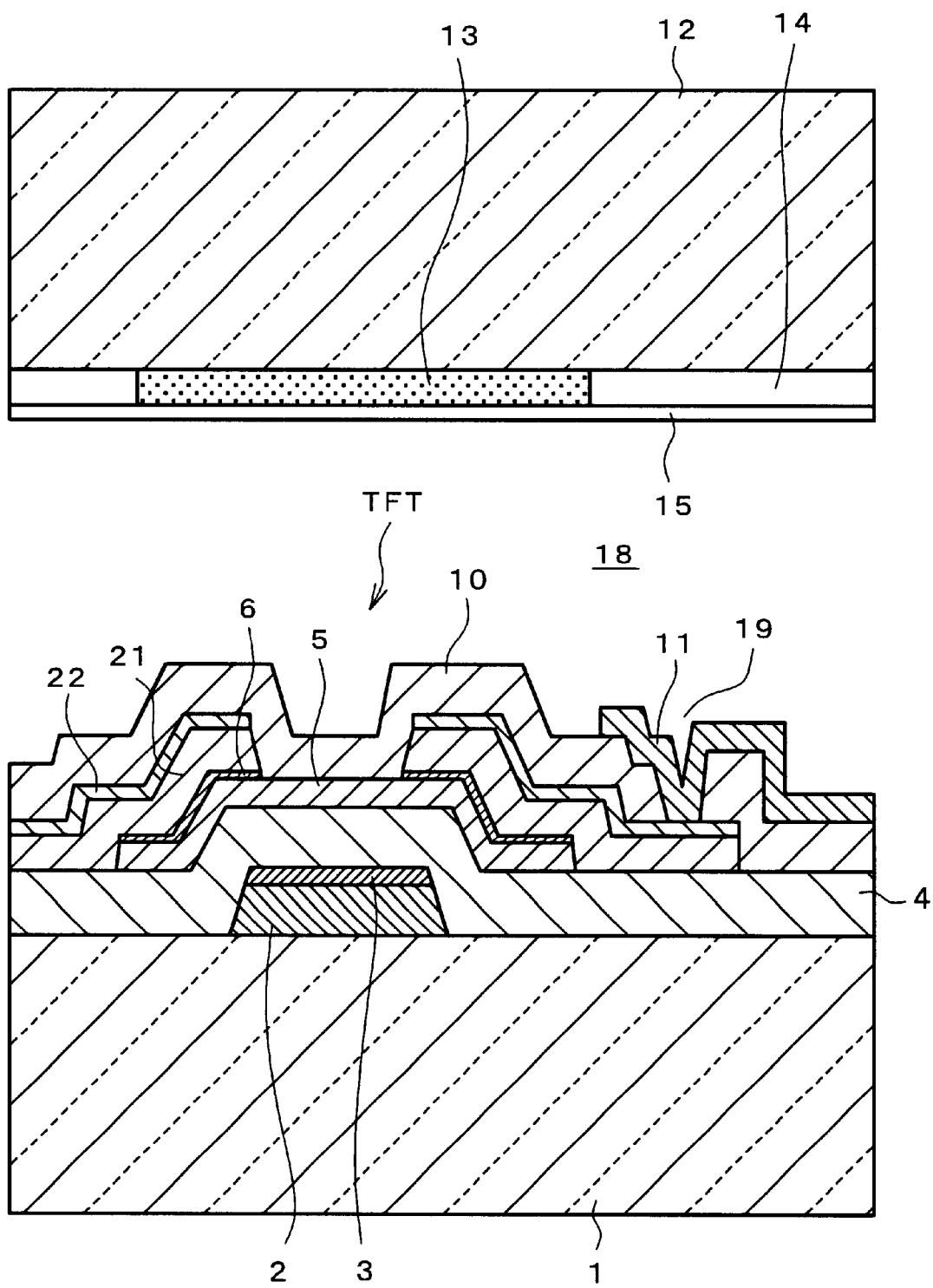
FIG. 13 is a schematic cross-sectional view of a portion of still another liquid crystal display device according to the present invention.
Figure 14:
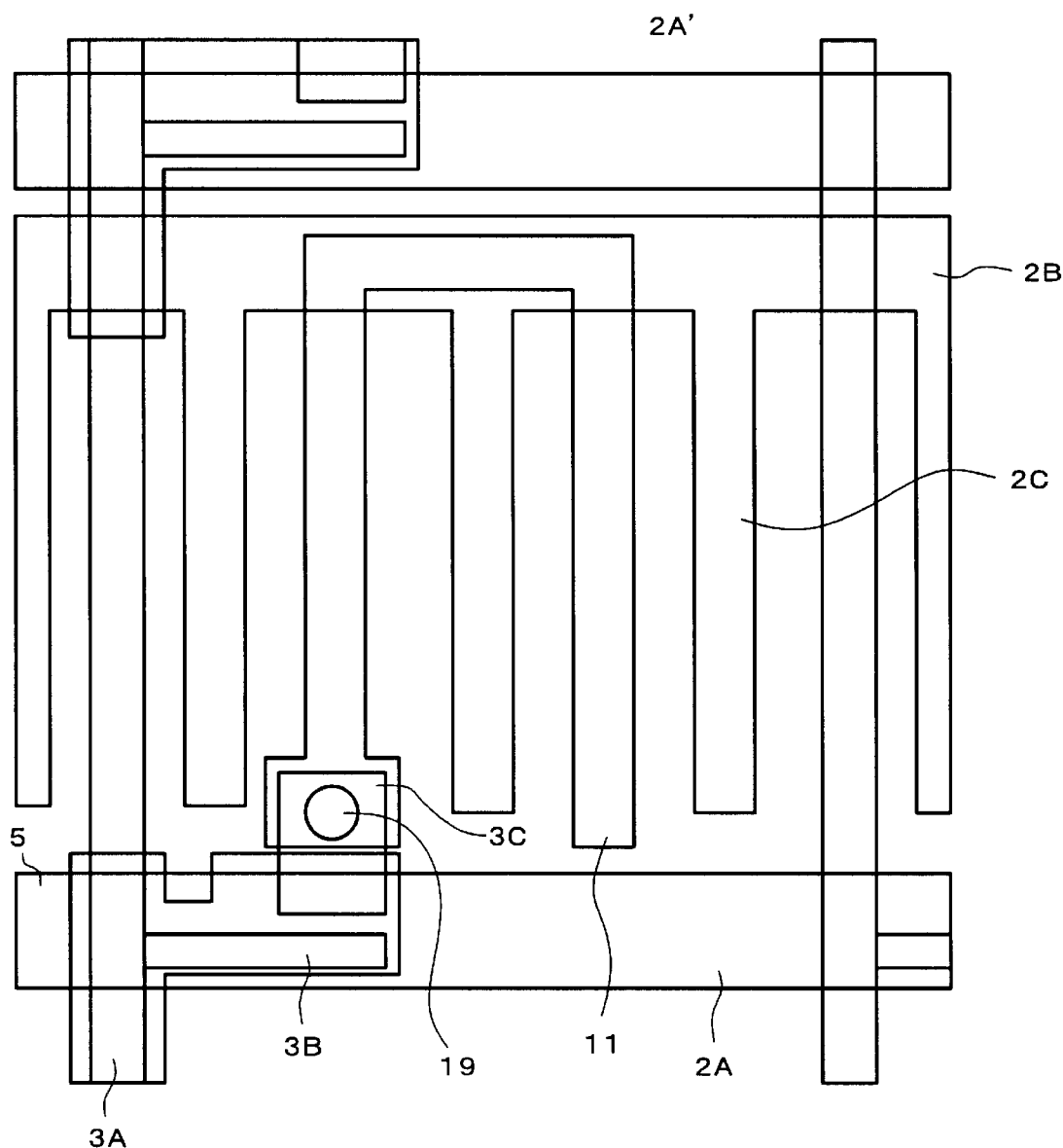
FIG. 14 is a plan view of one pixel region of the liquid crystal display device according to the present invention.

FIGS. 13 and 14 shows an example where the present invention is applied to an in-plane switching (IPS) mode liquid crystal cell. FIG. 13 is a cross-sectional view of the liquid crystal cell of this example, and FIG. 14 is a plan view thereof.

Referring to FIG. 14, a Mo-8 wt % Zr/Al-9.8 wt % Nd layered structure is patterned to form gate lines 2A, counter electrode lines 2B, and counter electrodes 2C simultaneously. After formation of a semiconductor layer, a Cr-30 wt % Mo/Cr layered structure is formed and patterned to form drain lines 3A, drain electrodes 3B, and source electrodes 3C. A Mo alloy layer having a dry etching resistance may also be used instead of Cr. A SiN film is formed by CVD as a passivation layer 10, and dry-etched to form through holes 19 on the source electrodes. Then, a poly-ITO film is formed and etched to form transparent comb electrodes 11 as pixel electrodes by wet etching with hydrobromic acid (HBr). In this way, a TFT substrate is completed. A black matrix layer 13, color filters 14, and a surface smoothing film 15 are formed on a glass substrate 12 to form a color filter substrate. The color filter substrate and the TFT substrate are bonded together, and a liquid crystal material 18 for IPS is injected in a space between the two substrates.

In this example, by using the Mo/Al layered structure, the sheet resistance of the counter electrode lines formed simultaneously with the gate electrodes is as small as 0.3 Ω/sq. This allows for setting a small time constant for the counter electrode lines, and thus realizing a large-area IPS mode liquid crystal display device having a viewing angle of 160°.

In this example, the Cr-30 wt % Mo/Cr layered structure, or a single Mo alloy layer having a dry etching resistance, was used for the source/drain lines. Alternatively, the three-layer structure of Mo-8 wt % Zr, Al—Nd, and Mo-8 wt % Zr may be used as in Example 1. In this case, amorphous indium tin oxide (a-ITO) or indium zinc oxide (IZO) should be used for the transparent pixel electrodes so as to allow for wet-etching with a weak acid or aqua regia containing a high concentration of nitric acid, whereby the source/drain lines ensure resistance against the etching for the ITO film. Alternatively, dry etching with HBr gas also provides substantially the same effect. When the counter electrode lines 2B are in the same layer as the gate lines 2A as shown in FIG. 14, the number of intersections with the drain lines 3A is doubled, resulting in increasing the probability of gate-drain or drain-counter electrode short circuiting due to defects of the gate insulating film 4 shown in FIG. 13. To solve this problem, the upper Mo alloy layer of the gate lines and the counter electrodes is electrochemically removed, and the exposed Al alloy surface is anodized to selectively form an aluminum oxide film on the gate lines/electrodes. As a result, since both the plasma SiN film and the aluminum oxide film can serve as the gate insulting film, the probability of interlayer short circuiting can be greatly reduced.

Example 4

Figure 20:
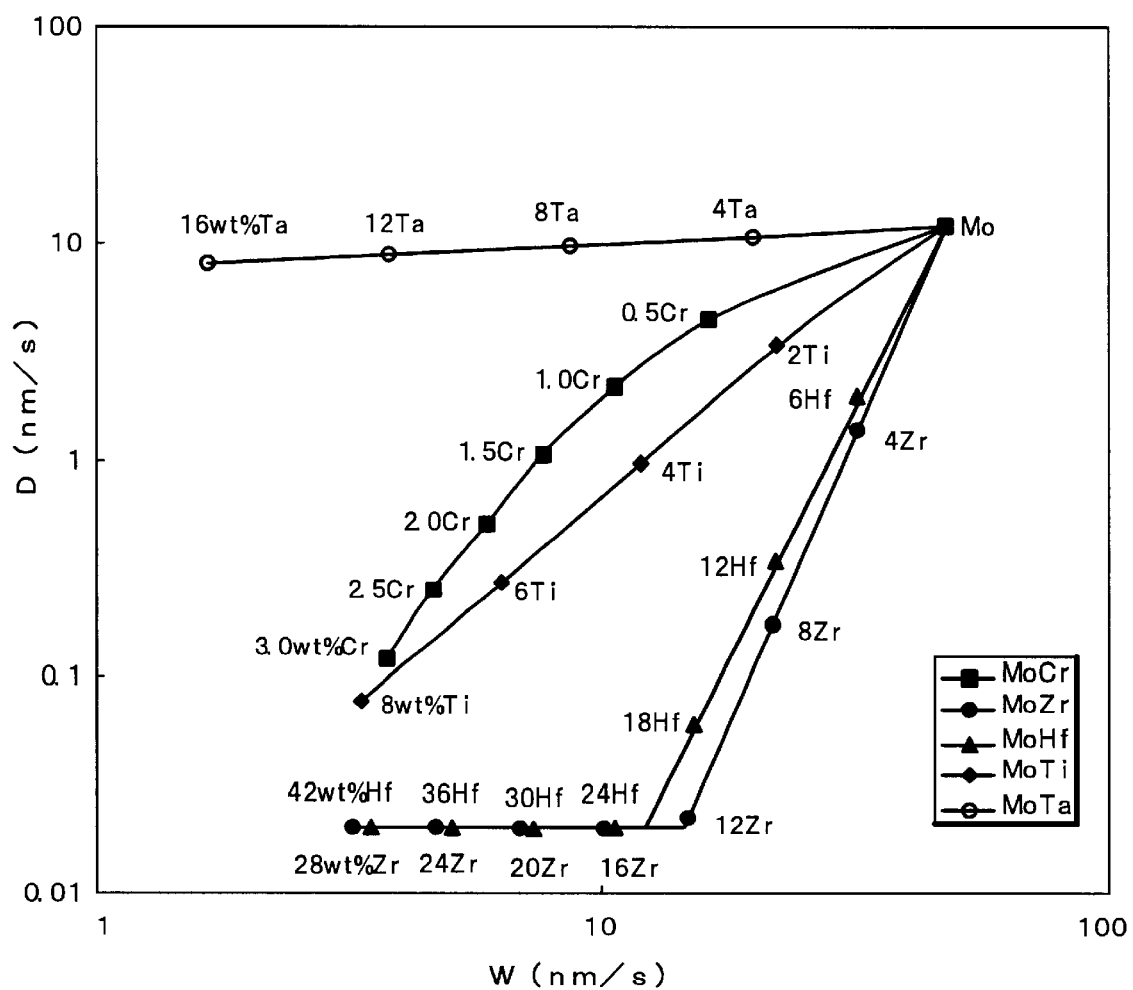
FIG. 20 is a graph showing the dependency of the wet etching rate and the dry etching rate on the amount of an added element in the alloy.

In this example, a Mo-7 wt % Zr-0.4 % Cr/Al-9.8 wt % Nd layered structure is used for the gate lines. As described above with reference to FIG. 20, chromium provides the function of reducing both the wet etching rate and the dry etching rate of a molybdenum alloy when added to molybdenum, as zirconium and hafnium do. In the above examples, used mainly as the added element to Mo were Zr and Hf that exhibit a comparatively mild effect on the wet etching rate so that control of the layered interconnections is easy. Alternatively, chromium may be used as the main added element. Since only a minute amount of chromium exhibits a great effect, about 0.4 wt % of chromium may be added in place of part of zirconium. In addition to the control of the etching rate mentioned above, chromium has an effect of greatly improving the production efficiency of the sputtering target. That is, since chromium has a low melting point compared with other elements, sintering of the molybdenum alloy in a hot isostatic press (HIP) method improves, which in turn improves the sintering density in the sputtering target and reduces formation of fine holes. As a result, abnormal discharge during sputtering and splashing due to the existence of fine holes greatly decrease.

Addition of an appropriate amount of chromium may also be advantageous when the Mo alloy layer of the layered interconnections is to be removed by electrolytic etching or the like since chromium is easily subjected to electrolytic etching. In this case, also, since chromium exhibits a great effect on the etching characteristics, only a small amount, i.e., 1 wt % or less, preferably about 0.4 wt %, may be added.

Example 5

Titanium exhibits an intermediate effect between the effect of zirconium and hafnium and that of chromium as the added element for controlling the etching characteristics. Therefore, Mo-5 % Ti-0.4 wt % Cr/Ar-9.8 wt % Nd or Mo-6 % Ti/Al-9.8 wt % Nd has an effect similar to that described above. The molybdenum-titanium alloy has another effect of stabilizing unstable molybdenum oxide formed on the molybdenum surface in the atmosphere or in an aqueous solution by formation of titanium oxide ($TiO_2$), thereby improving the adhesion to the resist. As a result, disconnection due to infiltration of an etchant caused by local insufficient adhesion between the resist and the molybdenum layer is prevented.

Example 6

Figure 15A:
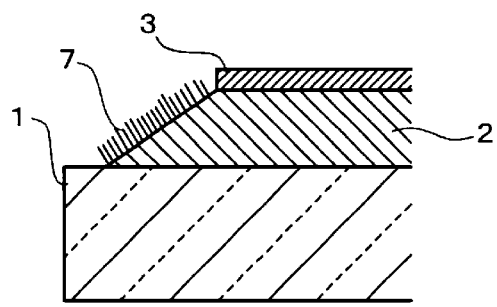
FIGS. 15, 16, 17, and 18 illustrate sectional shapes of an interconnection according to the present invention.
Figure 15B:
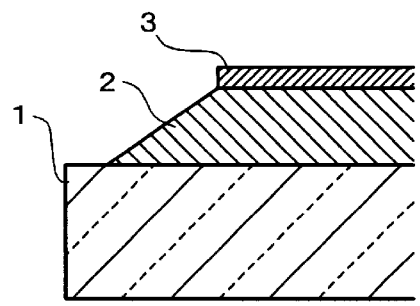

FIGS. 15(a) and 15(b) show sectional shapes of an interconnection obtained when a layered structure composed of a lower Al alloy layer and an upper Mo alloy layer is wet-etched by the shower method.

An Al alloy layer 2 and a Mo alloy layer 3 are sequentially formed on a glass substrate 1. Specifically, in this example, as in Example 1, an Al alloy containing 9.8 wt % of Nd was deposited to a thickness of 240 nm as the Al alloy layer 2, and sequentially a Mo alloy containing 1.6 wt % of Cr was deposited to a thickness of 20 nm as the Mo alloy layer 3, by sputtering. Thereafter, using a resist pattern formed by lithography, these layers are wet-etched in a shower etching apparatus. In this example, used as an etchant was a mixture including phosphoric acid ($H_3PO_4$), nitric acid ($HNO_3$), acetic acid ($CH_3COOH$), and water ($H_2O$) in which the concentration of the nitric acid was 12 mol %. FIG. 15(a) shows the sectional shape obtained when no ammonium fluoride or hydrogen fluoride is added to the etchant, while FIG. 15(b) shows the sectional shape obtained when 0.01 mol % of ammonium fluoride is added to the etchant.

When no ammonium fluoride or hydrogen fluoride is added to the etchant, whisker-like protrusions 7 were observed on the side face of the lower Al alloy layer 2 as shown in FIG. 15(a). When a SiN film was formed over the resultant interconnections by CVD, the coverage of the SiN film was insufficient. When 0.01 mol % of ammonium fluoride was added to the etchant, the sectional shape of the interconnection was generally tapered at an angle of 24 to 30° as in the case of Example 1 where 0.1 mol % of ammonium fluoride was added. This tapered sectional shape at an angle of 24 to 30° was also obtained when 0.01 mol % or 0.1 mol % of hydrogen fluoride was added in place of ammonium fluoride. The SiN film formed over the resultant interconnections exhibited sufficient coverage.

FIGS. 16(a) to 16(e) show sectional shapes of an interconnection when a layered structure composed of a lower Al alloy layer and an upper Mo alloy layer is wet-etched by the shower method.

An Al alloy layer 2 and a Mo alloy layer 3 are sequentially formed on a glass substrate 1. Specifically, in this example, as in Example 1, an Al alloy containing 9.8 wt % of Nd was deposited to a thickness of 240 nm as the Al alloy layer 2, and sequentially a Mo alloy containing 1.6 wt % of Cr was deposited to a thickness of 20 nm as the Mo alloy layer 3, by sputtering. Thereafter, using a resist pattern formed by lithography, these layers are wet-etched in a shower etching apparatus. In this example, used as an etchant was a mixture including phosphoric acid ($H_3PO_4$), nitric acid ($HNO_3$), acetic acid ($CH_3COOH$), and water ($H_2O$) with 0.01 mol % of ammonium fluoride added thereto.

Figure 16A:
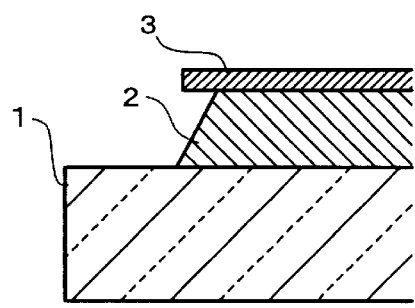
Figure 16B:
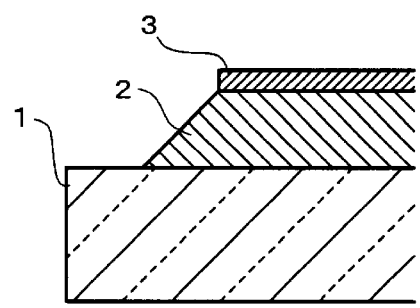
Figure 16C:
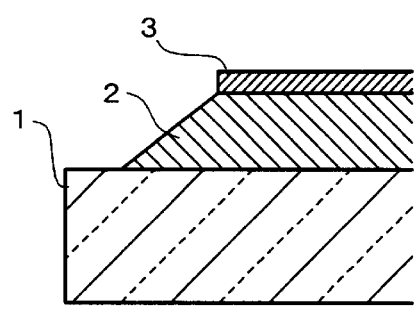
Figure 16D:
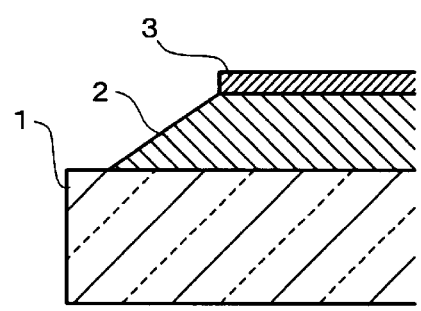
Figure 16E:
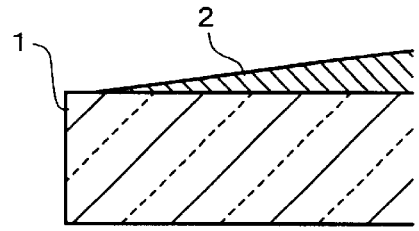

FIG. 16(a) shows the sectional shape obtained when the nitric acid concentration of the etchant is 5.0 mol %, in which the upper Mo alloy layer 3 protrudes like a brim. When the SiN film was formed by CVD over the interconnections with this shape, the coverage of the SiN film was insufficient. FIG. 16(b) shows the sectional shape obtained when the nitric acid concentration of the etchant is 7.0 mol %, exhibiting generally a tapered sectional shape at an angle of 45 to 49°. The coverage of the overlying SiN film formed by CVD was sufficient. FIG. 16(c) shows the sectional shape obtained when the nitric acid concentration of the etchant is 9.5 mol %, exhibiting generally a tapered sectional shape at an angle of about 35 to 40°. The coverage of the overlying SiN film formed by CVD was sufficient. FIG. 16(d) shows the sectional shape obtained when the nitric acid concentration of the etchant is 12.0 mol %, exhibiting generally a tapered sectional shape at an angle of about 25 to 30°. The coverage of the overlying SiN film was sufficient. FIG. 16(e) shows the sectional shape obtained when the nitric acid concentration of the etchant is 14.5 mol %. In this case, the upper Mo alloy layer greatly drew back and spotted defects were locally observed on the interconnections.

FIGS. 17(a) to 17(e) show sectional shapes of an interconnection obtained when a layered structure composed of a lower Al alloy layer and an upper Mo alloy layer is wet-etched by the shower method.

An Al alloy layer 2 and a Mo alloy layer 3 are sequentially formed on a glass substrate 1. Specifically, in this example, an Al alloy containing 9.8 wt % of Nd was deposited to a thickness of 240 nm as the Al alloy layer 2, and sequentially a Mo alloy containing Cr, Hf, Zr, or Ti in various amounts was deposited to a thickness of 20 nm as the Mo alloy layer 3, by sputtering. Thereafter, using a resist pattern formed by lithography, these layers are wet-etched in a shower etching apparatus. In this example, used as an etchant was a mixture including phosphoric acid ($H_3PO_4$), nitric acid ($HNO_3$), acetic acid ($CH_3COOH$), and water ($H_2O$) in which the concentration of the nitric acid was 12 mol %, with 0.1 mol % of ammonium fluoride added thereto.

Figure 17A:
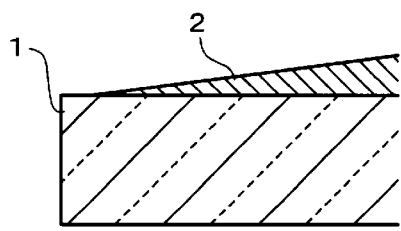
Figure 17B:
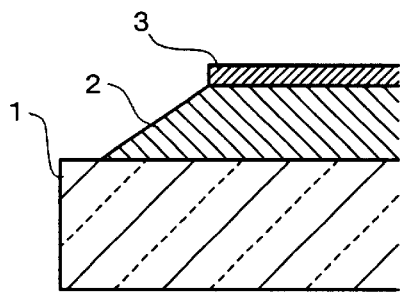
Figure 17C:
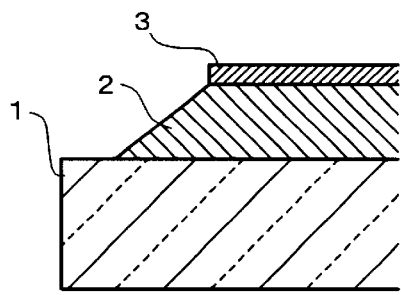
Figure 17D:
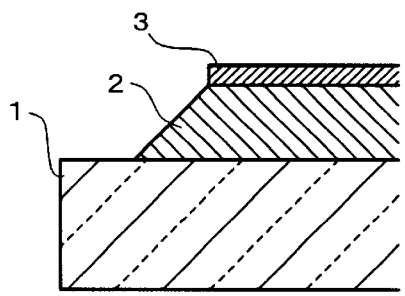
Figure 17E:
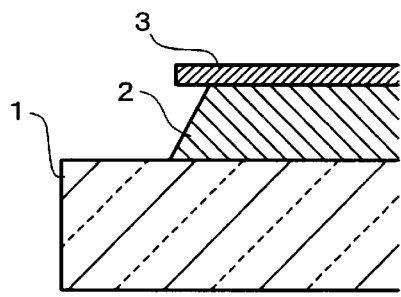

FIG. 17(a) shows the sectional shape obtained when the Mo alloy layer 3 is pure Mo containing no Cr, Hf, Zr, or Ti. In this case, the upper Mo alloy layer greatly drew back and spotted defects were locally observed on the interconnections. FIG. 17(b) shows the sectional shape obtained when the Mo alloy layer 3 contains 0.4 wt % of Cr, exhibiting a tapered sectional shape at an angle of about 20 to 25°. This tapered sectional shape at an angle of about 20 to 25° was also observed when the Mo alloy layer 3 contains 12 wt % of Hf, 8 wt % of Zr, or 2 wt % of Ti. When the SiN film was formed by CVD over the interconnections with this shape, the coverage of the SiN film was sufficient. FIG. 17(c) shows the sectional shape obtained when the Mo alloy layer 3 contains 1.5 wt % of Cr, exhibiting a tapered sectional shape at an angle of about 25 to 30°. This tapered sectional shape at an angle of about 25 to 30° was also observed when the Mo alloy layer 3 contains 30 wt % of Hf, 20 wt % of Zr, or 6 wt % of Ti. The coverage of the overlying SiN film formed by CVD was sufficient. FIG. 17(d) shows the sectional shape obtained when the Mo alloy layer 3 contains 3.0 wt % of Cr, exhibiting a tapered sectional shape at an angle of about 35 to 40°. This tapered sectional shape at an angle of about 35 to 40° was also observed when the Mo alloy layer 3 contains 41 wt % of Hf, 26 wt % of Zr, or 7.6 wt % of Ti. The coverage of the overlying SiN film formed by CVD was sufficient. FIG. 17(e) shows the sectional shape obtained when the Mo alloy layer 3 contains 4.0 wt % of Cr, in which the upper Mo alloy layer 3 protrudes like a brim. This brim-like shape was also observed when the Mo alloy layer 3 contains 48 wt % of Hf, 32 wt % of Zr, or 9 wt % of Ti. The coverage of the overlying SiN film formed by CVD was insufficient.

Figure 18A:
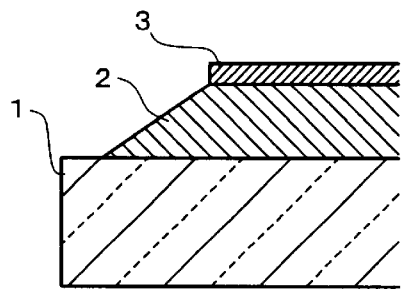
Figure 18B:
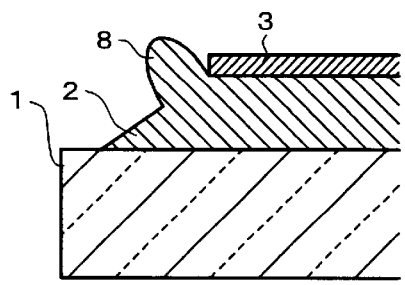

FIGS. 18(a) and 18(b) show sectional shapes of an interconnection obtained when a layered structure composed of a lower Al alloy layer and an upper Mo alloy layer is wet-etched by the shower method.

An Al alloy layer 2 and a Mo alloy layer 3 are sequentially formed on a glass substrate 1. Specifically, in this example, an Al alloy containing Nd in various amounts was deposited to a thickness of 240 nm as the Al alloy layer 2, and sequentially a Mo alloy containing 1.5 wt % of Cr was deposited to a thickness of 20 nm as the Mo alloy layer 3, by sputtering. Thereafter, using a resist pattern formed by lithography, these layers are wet-etched in a shower etching apparatus. In this example, used as an etchant was a mixture including phosphoric acid ($H_3PO_4$), nitric acid ($HNO_3$), acetic acid ($CH_3COOH$), and water ($H_2O$) in which the concentration of the nitric acid was 12 mol %, with 0.1 mol % of ammonium fluoride added thereto.

FIG. 18(a) shows the sectional shape obtained when the Al alloy layer 2 contains 9.8 wt % of Nd, exhibiting a tapered sectional shape at an angle of about 25 to 30°. The coverage of the overlying SiN film formed by CVD was sufficient. FIG. 18(b) shows the sectional shape obtained when the Al alloy layer 2 contains 0.1 wt % of Nd. In this case, a protrusion, presumably a hillock, was observed on the side face of the lower Al alloy layer 2 of the interconnection. The coverage of the overlying SiN film formed by CVD was insufficient. That is, when the Al alloy layer 2 contains 0.1 wt % of Nd, a tapered sectional shape at an angle of about 25 to 30° as shown in FIG. 18(a) was once obtained. However, when subjected to heat treatment at a temperature of 350° C. in vacuum after the wet etching, a protrusion, presumably a hillock, was generated on the side face of the Al alloy. layer as shown in FIG. 18(b).

Example 7

Figure 19A:
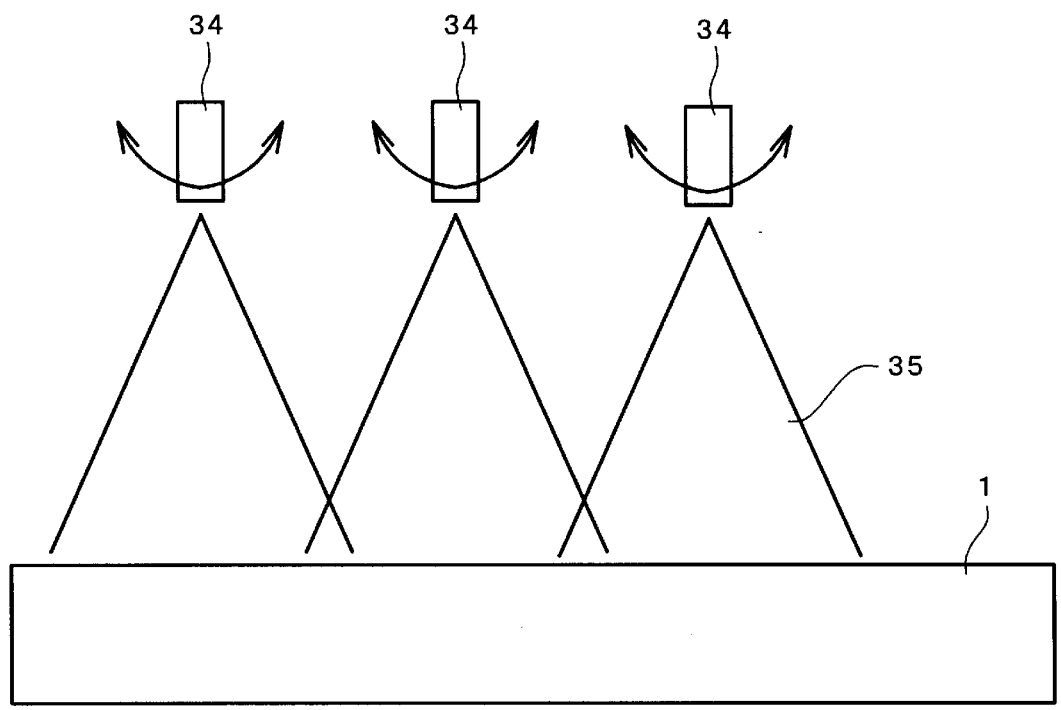
FIGS. 19A and 19B illustrate etching in a fabrication process according to the present invention.
Figure 19B:
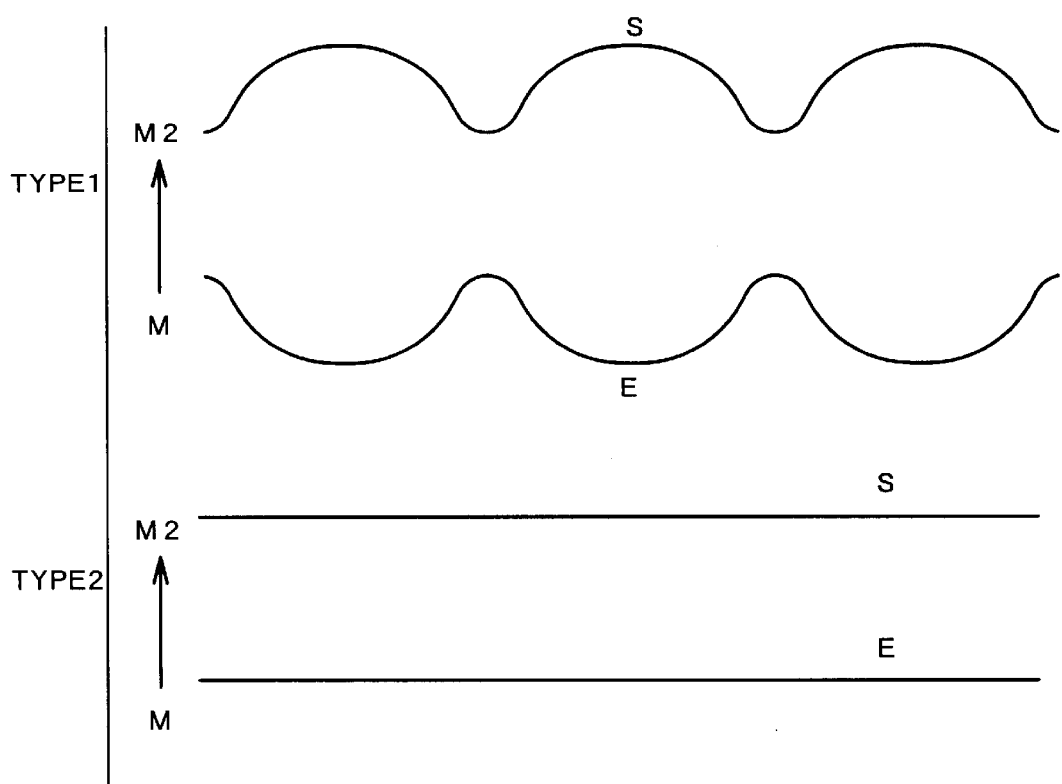

FIG. 19 is a schematic illustration of the shower wet etching method. A glass substrate is showered with an etchant while it is being transported on a roller conveyer. In FIG. 19, the substrate proceeds in the direction perpendicular to the plane of the figure. The etchant is poured radially from etching nozzles 34. In order to enhance uniformity of the etching, the etching nozzles 34 are positioned so that the radial showers from the respective etching nozzles overlap each other to ensure uniform etching without a variation in supply of the etchant.

In the etching of the layered structure of Mo-8 wt % Zr/Al-9.8 wt % Nd as the interconnection material used in the present invention, however, the etching rate changes with even a slight variation in shower flow distribution. In particular, the etching rate of the Al layer becomes lower as the flow is larger. This causes a phenomenon that the etching rate of the Al layer is low at the portions right under the etching nozzles where the shower flow is large, reducing the side etching amount in these portions. The reverse phenomenon occurs in the shower overlap portions of the Al layer. As a result, a variation in side etching amount depending on the distribution of the nozzles is generated. This worsens the in-plane size precision distribution of the interconnections, and thus generates a variation in image quality of the liquid crystal display.

According to the present invention, in order to solve the above problem, the etching nozzles are shaken in the direction perpendicular to the horizontal conveyance of the substrate during the etching of the Mo alloy/Al alloy layered structure. The optimal angle of shaking is preferably in the range of 40 to 100°. By shaking the nozzles, the shower flow is averaged temporally, and as a result, the variation in side etching amount, i.e., the variation in the size of interconnections, is greatly reduced. The Mo layer may be further etched when the Mo layer is being rinsed with water after the etching depending on the composition of the etchant. In this case, the water replacing rate during rinsing also needs to be averaged in the plane of the substrate. It has been confirmed that in this case also the shower nozzle shaking is effective. Thus, as described above, the gate lines (electrodes) and the source/drain lines (electrodes) are formed of a layered structure including a molybdenum alloy layer containing at least one of chromium, titanium, tantalum, and niobium that forms a solid solution with molybdenum and an aluminum alloy layer. With such a layered structure, it becomes easier to reduce the resistance of the interconnections and thereby increase the screen size. Also, the photo-etching process of the interconnections and electrodes is simplified. Thus, an inexpensive, highly-reliable liquid crystal display device free of display failure can be provided.

Many modifications and variations of the present invention will be apparent to those skilled in the art without departing from the scope and spirit of the invention. It should therefore be understood that the present invention is not limited to the specific embodiments illustrated herein but only defined by the appended claims.

What is claimed is:

1. A liquid crystal display device comprising:
   a pair of substrates;
   a liquid crystal layer interposed between said pair of substrate; and
   drain lines and gate lines formed on one of said pair of substrates and cross each other in a matrix form;
   wherein at least one of said drain lines and gate lines has a layered structure formed of a first conductive layer and a second conductive layer;
   and said first conductive layer includes Al as a main component and said second conductive layer includes Mo in a range between 77 wt. % to 96 wt. % and Zr in a range between 4 wt. % to 23 wt. %.

2. The liquid crystal display device according to claim 1, wherein said second conductive layer includes Mo containing Zr and Hf as a main component.

3. The liquid crystal display device according to claim 1, wherein said gate lines have a layered structure formed of said first and second conductive layers.

4. The liquid crystal display device according to claim 1, further comprising at least a pair of a pixel electrode and a counter electrode formed on one of the pair of substrates in each of a plurality of pixels respectively defined by said plurality of gate lines and drain lines, wherein an image signal is supplied from a drain line to a pixel electrode via a thin film transistor driven based on supply of a scanning signal from a gate line, and a counter voltage signal line is connected to said counter electrode, said counter voltage signal line or said counter electrode having a layered structure formed of said first and second conductive layers.

5. The liquid crystal display device according to claim 4, wherein said gate lines are in the same layer as said counter voltage signal line and said counter electrode,
   the drain lines are in a layer above said gate lines via a first insulating film, and said pixel electrodes are in a layer above the drain lines via a second insulating film, said pixel electrodes being connected with the layer including Mo containing Zr as a main component via connecting means formed through said second insulating film.

6. The liquid crystal display device according to claim 5, wherein said pixel electrodes are made of either ITO or IZO.

7. The liquid crystal display device according to claim 4, wherein said first conductive layer including Al as a main component has been anodized.

8. The liquid crystal display device according to claim 1, wherein said first conductive layer including Al as a main component has been anodized.

9. The liquid crystal display device according to claim 1, wherein said second conductive layer is formed on said first conductive layer, and the sectional shape of said first conductive layer is a tapered shape.

10. The liquid crystal display according to claim 1, wherein the first conductive layer is an Al—Nd alloy.

11. A liquid crystal display device comprising:
    a pair of substrates;
    a liquid crystal layer interposed between said pair of substrates; and
    drain lines and gate lines formed on one of said pair of substrates and crossing each other in a matrix form;
    wherein at least one of said drain lines and gate lines has a layered structure formed of a first conductive layer and a second conductive layer; and
    said first conductive layer includes Al as a main component and said second conductive layer includes Mo in a range between 64 wt. % to 92.7 wt. % and Hf in a range between 7.3 wt. % to 36 wt. %.

12. The liquid crystal display device according to claim 11, wherein said second conductive layer includes Mo containing Zr and Hf as a main component.

13. The liquid crystal display device according to claim 11, herein said gate lines have a layered structure formed of said first and second conductive layers.

14. The liquid crystal display device according to claim 11, wherein said second conductive layer is formed on said first conductive layer, and the sectional shape of said first conductive layer is a tapered shape.

15. The liquid crystal display device according to claim 11, wherein said gate lines are in the same layer as said counter voltage signal line and said counter electrode,
    the drain lines are in a layer above said gate lines via a first insulating film, and said pixel electrodes are in a layer above the drain lines via a second insulating film, said pixel electrodes being connected with the layer including Mo containing Zr as a main component via connecting means formed through said second insulating film.

16. The liquid crystal display device according to claim 15, wherein said pixel electrodes are made of either ITO or IZO.

17. The liquid crystal display according to claim 11, wherein the first conductive layer is an Al—Nd alloy.

18. A liquid crystal display device comprising:
    a pair of substrates;
    a liquid crystal layer interposed between said pair of substrates; and drain lines and gate lines formed on one of said pair of substrates and crossing each other in a matrix form;

wherein at least one of said drain lines and gate lines has a layered structure formed of a first conductive layer, a second conductive layer and a third conductive layer, and said second conductive layer includes Al as a main component, said first and third conductive layers include Mo in a range between 77 wt. % to 96 wt. % and Zr in a range between 4 wt. % and 23 wt. %.

19. The liquid crystal display device according to claim 18, wherein said second conductive layer includes Mo containing Zr and Hf as a main component.

20. The liquid crystal display device according to claim 18, wherein said gate lines have a three-layer structure formed of said first, second, and third conductive layers.

21. The liquid crystal display device according to claim 18, further comprising at least a pair of a pixel electrode and a counter electrode formed on one of the pair of substrates in each of a plurality of pixels respectively defined by the plurality of gate lines and the plurality of drain lines, wherein an image signal is supplied from a drain line to a pixel electrode via a thin film transistor driven based on supply of a scanning signal from a gate line, and a counter voltage signal line is connected to said counter electrode, said counter voltage signal line or said counter electrode having a three-layer structure formed of said first, second and third conductive layers.

22. The liquid crystal display device according to claim 21, wherein said gate lines are in the same layer as said counter voltage signal line and said counter electrode, the drain lines are in a layer above said gate lines via a first insulating film, and said pixel electrodes are in a layer above the drain lines via a second insulating film, said pixel electrodes being connected with the layer including Mo containing Zr as a main component via connecting means formed through said second insulating film.

23. The liquid crystal display device according to claim 22, wherein said pixel electrodes are made of either ITO or IZO.

24. The liquid crystal display device according to claim 7, wherein said second conductive layer is formed on said first conductive layer, and the sectional shape of said first conductive layer is a tapered shape.

25. The liquid crystal display according to claim 18, wherein the second conductive layer is an Al—Nd alloy.

26. A liquid crystal device comprising:
a liquid crystal layer sandwiched by a pair of substrates;
a plurality of gate lines formed on one of the pair of substrates;
a plurality of drain lines intersecting said gate lines in a matrix shape;
thin film transistors driven in response to supply of a scanning signal from said gate lines;
an image signal supplied from the drain lines to said pixel electrodes via the thin film transistors; and
a counter electrode formed to face said pixel electrodes, a counter voltage being supplied to said counter electrode via a counter voltage signal line,
wherein any of said gate lines, said drain lines, said counter voltage signal line, and said counter electrode have a layered structure formed of a first conductive layer and a second conductive layer, and
said first conductive layer includes Al as a main component and said second conductive layer includes Mo and Zr, the content of the Mo being in a range between 77 wt. % to 96 wt. % and Zr being in a range between 4 wt. % to 23 wt. %.

27. The liquid crystal display device according to claim 26, wherein said gate lines and said counter voltage signal line have a layered structure formed of said first and second conductive layers.

28. The liquid crystal display device according to claim 26, wherein said second conductive layer is formed on said first conductive layer, and the sectional shape of said first conductive layer is a tapered shape.

29. The liquid crystal display device according to claim 26, wherein said gate lines are in the same layer as said counter voltage signal line and said counter electrode, the drain lines are in a layer above said gate lines via a first insulating film, and said pixel electrodes are in a layer above the drain lines via a second insulating film, said pixel electrodes being connected with the layer including Mo containing Zr as a main component via connecting means formed through said second insulating film.

30. The liquid crystal display device according to claim 29, wherein said pixel electrodes are made of either ITO or IZO.

31. The liquid crystal display according to claim 26, wherein the first conductive layer is an Al—Nd alloy.

32. A liquid crystal display device comprising:
a liquid crystal layer sandwiched by a pair of substrates;
a plurality of gate lines formed on one of said pair of substrates;
a plurality of drain lines intersecting said gate lines in a matrix shape;
thin film transistors driven in response to supply of a scanning signal from said gate lines; and
an image signal supplied from the drain lines to said pixel electrode via the thin film transistor,
wherein any of said gate lines and drain lines have a layered structure of a first conductive layer and a second conductive layer, and
said first conductive layer includes Al as a main component and said second conductive layer includes Mo, Cr, and Zr, the content of the Mo being in a range between 77 wt. % to 96 wt. %, the content of Zr being in a range between 4 wt. % to 23 wt. %, and the content of Cr being in a range of 0.4 wt. % to 1 wt. %.

33. A liquid crystal display device comprising:
a liquid crystal layer sandwiched by a pair of substrates;
a plurality of gate lines formed on one of the said pair of substrates;
a plurality of drain lines intersecting said gate lines in a matrix shape;
thin film transistors driven in response to supply of a scanning signal from said gate lines; and
an image signal supplied from the drain lines to said pixel electrode via the thin film transistor;
wherein an SiN film is formed on the drain electrode and source electrode of the thin film transistor,
said pixel electrode is formed on the source electrode,
a through hole is formed in the SiN film to connect said pixel electrode and said source electrode,
said source electrode has a layered structure of a first conductive layer and a second conductive layer, and
said first conductive layer includes Al as a main component, and said second conductive layer includes Mo in a range between 77 wt. % to 96 wt. % and Zr in a range between 4 wt. % to 23 wt. %.

* * * * *